(12) United States Patent
Xu

(10) Patent No.: US 9,204,241 B2
(45) Date of Patent: Dec. 1, 2015

(54) METHOD, DEVICE AND MOBILE TERMINAL UTILIZING BARCODE IMAGES FOR COMMUNICATION

(75) Inventor: Wei Xu, Shanghai (CN)

(73) Assignee: Wei Xu (CN)

(*) Notice: Subject to any disclaimer, the term of this patent is extended or adjusted under 35 U.S.C. 154(b) by 0 days.

(21) Appl. No.: 14/112,578

(22) PCT Filed: Apr. 17, 2012

(86) PCT No.: PCT/CN2012/074186
§ 371 (c)(1),
(2), (4) Date: Dec. 18, 2013

(87) PCT Pub. No.: WO2012/142937
PCT Pub. Date: Oct. 26, 2012

(65) Prior Publication Data
US 2014/0120886 A1 May 1, 2014

(30) Foreign Application Priority Data
Apr. 18, 2011 (CN) .............................. 2011 1 097164

(51) Int. Cl.
*H04M 3/42* (2006.01)
*H04W 4/00* (2009.01)
(Continued)

(52) U.S. Cl.
CPC .............. *H04W 4/003* (2013.01); *H04M 1/0266* (2013.01); *H04M 2250/52* (2013.01); *H04W 4/001* (2013.01); *H04W 4/008* (2013.01); *H04W 12/06* (2013.01)

(58) Field of Classification Search
CPC ..... H24W 12/04; H04W 4/001; H04W 12/06; H04W 4/008; H04M 2250/52; H04M 1/0266
USPC ..................................................... 455/414.1
See application file for complete search history.

(56) References Cited

U.S. PATENT DOCUMENTS 6,993,573 B2    1/2006  Hunter
2005/0011958 A1*  1/2005  Fukasawa et al. ....... 235/462.46
(Continued)

FOREIGN PATENT DOCUMENTS

CN      1778129      5/2006
CN      1802628      7/2006
(Continued)

OTHER PUBLICATIONS

International Search Report dated Jul. 5, 2012 issued in corresponding International patent application No. PCT/CN2012/074186.
(Continued)

*Primary Examiner* — Charles Appiah
*Assistant Examiner* — Jaime Holliday
(74) *Attorney, Agent, or Firm* — Ostrolenk Faber LLP

(57) ABSTRACT

Disclosed are a method and a device utilizing barcode images to communicate between a mobile terminal and a backend server and a mobile terminal thereof, which can correctly decode a barcode image of any code format, ensure the security of user information, and provide services on the side of the mobile terminal in the absence of the backend server. The method of the present invention includes the following steps: registering as a user of the backend server through the mobile terminal; taking a picture of the barcode image by using a camera disposed in the mobile terminal; decoding the taken barcode image to obtain coding information; parsing the coding information to determine whether the barcode image is generated according to a preset coding rule; the mobile terminal extracting service information corresponding to the coding information; the mobile terminal sending a service providing request message to the backend server; and the backend server providing a service to the mobile terminal according to content of the service providing request message.

33 Claims, 18 Drawing Sheets

(51) Int. Cl.
    *H04M 1/02*     (2006.01)
    *H04W 12/06*    (2009.01)

(56) References Cited

U.S. PATENT DOCUMENTS

2006/0065733 A1* 3/2006 Lee et al. .................. 235/462.01
2008/0200153 A1* 8/2008 Fitzpatrick et al. ........ 455/414.1
2009/0254440 A1* 10/2009 Pharris ............................ 705/17
2011/0295502 A1* 12/2011 Faenger ........................ 701/211
2012/0029997 A1* 2/2012 Khan et al. ................. 705/14.27
2012/0223131 A1* 9/2012 Lim et al. ...................... 235/375

FOREIGN PATENT DOCUMENTS

| CN | 1841425 | 10/2006 |
|---|---|---|
| CN | 101256652 | 9/2008 |
| CN | 102 156 943 | 8/2011 |
| JP | 63-292283 | 11/1988 |
| JP | 2008-211515 | 9/2008 |
| JP | 2008-263385 | 10/2008 |
| WO | WO 2010/122 190 A1 | 10/2010 |

OTHER PUBLICATIONS

Japanese Office Action dated May 12, 2015 issued in Japanese Application No. 2014- 50/5497 with an English translation.
Response dated Aug. 20, 2015 to the May 12, 2015 Japanese Office Action issued in Japanese Application No. 2014-505497 with an English translation.
Response dated May 21, 2015 to the Oct. 18, 2014 extended European Search Report issued in European Application No. 12774742.6 (the extended European Search Report and the references cited therein were submitted in an Ids filed May 27, 2015).

* cited by examiner

METHOD, DEVICE AND MOBILE TERMINAL UTILIZING BARCODE IMAGES FOR COMMUNICATION

CROSS REFERENCE TO RELATED APPLICATIONS

The present application is a 35 U.S.C. §371 National Phase conversion of PCT/CN2012/074186, filed Apr. 17, 2012, which claims benefit of Chinese Application No. 201110097164.7, filed Apr. 18, 2011, the disclosure of which is incorporated herein by reference.

BACKGROUND OF THE INVENTION

1. Field of the Disclosure

The present invention relates to a communication method and a communication device, particularly to a method and a device utilizing barcode images to communicate between a mobile terminal and a backend server and a mobile terminal thereof, and further to a method and a device utilizing barcode images to communicate between a mobile terminal and a service providing device and a mobile terminal thereof.

2. Related Art

A two-dimensional code (dimensional barcode) uses a particular geometric figure and black-and-white graphics distributed in a two-dimensional direction according to certain rules to record data symbol information. Mobile phones' two-dimensional codes are applications of the two-dimensional code on mobile terminals. Mobile phones' two-dimensional code services are currently divided into two categories, i.e., mobile phone passively read class application and mobile phone actively read class application.

The mobile phone passively read class application generally means electronic certificates in the form of two-dimensional codes are transmitted and displayed on a screen of a mobile terminal after terminal users complete a transaction in various online or offline manners. Businesses can read and verify authenticity of the transaction through a dedicated device. The mobile phone passively read class application is applicable to e-tickets, e-coupons, electronic delivery coupons, electronic membership cards and payment certificates and so on. In the mobile phone passively read class application, mobile terminals only serve as devices for storing and displaying two-dimensional codes.

The mobile phone actively read class application uses camera-equipped mobile terminals as tools for identifying and reading two-dimensional codes, and mounts two-dimensional code reading software on the mobile terminals. The camera photographs two-dimensional code images printed on multiple carriers such as newspapers, magazines, advertisements, books, packages and personal business cards, and the two-dimensional code reading software decodes the photographed two-dimensional code images, so that the mobile terminal is connected to webpages corresponding to coding information of two-dimensional codes. In the mobile phone actively read class application, users can achieve fast Internet access without inputting URL addresses. However, in the current mobile phone actively read class application, the mobile terminal only can achieve Internet access through two-dimensional codes, and follow-up services, such as purchase and payment, cannot be provided in a one-stop manner.

Chinese patent application entitled "MOBILE TERMINAL SHOPPING METHOD AND SYSTEM THEREOF" whose Application No. is 200510033918.7 and Filing Date is 31 Mar. 2005 discloses a method and a system for implementing mobile terminal shopping by using a two-dimensional code. A mobile terminal photographs a two-dimensional code through a built-in camera and decodes the two-dimensional code, and the mobile terminal sends a payment request message to a payment subsystem and the payment subsystem completes payment.

Chinese patent entitled "METHOD FOR PROVIDING MOBILE SERVICES BY USING CODE GRAPH" whose Application No. is ZL200480005625.1 and Filing Date is 8 Mar. 2004 discloses a method and a system for providing mobile services by using a code graph, specifically a method and a system for providing content providing services, geographical information providing services, product information providing services, taxi call services, personal contact information providing services or payment services by using two-dimensional codes. A mobile terminal photographs a two-dimensional code through a built-in camera and decodes the two-dimensional code, the mobile terminal sends a service providing request message to a service provider server, the service provider server provides a service to the mobile terminal itself, or the service provider server communicates with another server, to provide a service to the mobile terminal.

In the prior art, the mobile terminals included in the two patent applications only can decode two-dimensional codes generated according to a certain predetermined coding rule, which do not have universality. If two-dimensional codes inconsistent with the predetermined coding rule are decoded, "Error" information often appears in the mobile terminals, thereby resulting in poor user experience.

In addition, it can be known from the technical solutions disclosed by the two patent applications that the mobile terminal definitely needs a backend server to provide various services. The mobile terminal is necessarily provided with client software, so as to communicate with the backend server. The mobile terminal generally has a wireless connection with the backend server through a wireless network. If in a place without a wireless network or in a place where a wireless network signal is poorer (for example, in a subway), it is hard for the mobile terminal to obtain provision of various services.

Additionally, in the prior art, the mobile terminals included in the two patent applications only can decode two-dimensional codes, but cannot generate two-dimensional codes themselves.

Moreover, in the prior art, when using the built-in camera in the mobile terminal to take a picture, a user of the mobile terminal judges whether a two-dimensional code image in a viewfinder screen is clear based on his/her own feelings, and then artificially presses the shoot button to take a picture. Such a two-dimensional code image sometimes may not be clear enough, resulting in subsequent decoding failure for the two-dimensional code. Thus, the user of the mobile terminal needs to take a picture of the two-dimensional code image once more until a shooting result is clear, and such an artificial shooting manner makes the shooting inefficient and the shooting step tedious.

Besides, in the prior art, the mobile terminals included in the two patent applications only obtain a service from the backend server, but the mobile terminals per se do not participate in providing the service, that is, the client software on the mobile terminals only send a request message to the backend server to obtain a service from the backend server. The client software on the mobile terminals has no capability of processing the service.

SUMMARY

In view of the above defects in the prior art, a first objective of the present invention is to provide a method and a device utilizing barcode images to communicate between a mobile terminal and a backend server and a mobile terminal thereof, so as to correctly decode a barcode image of any code format.

A second objective of the present invention is to provide a method and a device utilizing barcode images to communicate between a mobile terminal and a backend server and a mobile terminal thereof, so as to ensure the security of user information without encryption and decryption.

A third objective of the present invention is to provide a method and a device utilizing barcode images to communicate between a mobile terminal and a service providing device and a mobile terminal thereof, so as to provide services on the side of the mobile terminal.

To achieve the first objective of the present invention, according to preferred embodiments of the present invention, the present invention provides a method utilizing barcode images to communicate between a mobile terminal and a backend server, wherein the mobile terminal has a wireless connection with the backend server by using a wireless network, the method including: registering a user of the mobile terminal as a user of the backend server, and the backend server storing registration information of the user, wherein the user has a unique username; taking a picture of the barcode image by using a camera disposed in the mobile terminal; decoding the taken barcode image by using the mobile terminal to obtain coding information; parsing the coding information to determine whether the barcode image is generated according to a preset coding rule, if the barcode image is generated according to the preset coding rule, executing subsequent steps, and if the barcode image is not generated according to the preset coding rule, stopping executing the method after the mobile terminal is connected to a webpage corresponding to the coding information; the mobile terminal extracting service information corresponding to the coding information according to the coding information; the mobile terminal sending a service providing request message to the backend server, wherein the service providing request message at least includes information that can uniquely identify the mobile terminal; and the backend server providing a service to the mobile terminal according to content of the service providing request message.

Preferably, the method further includes: generating coding information corresponding to the service information according to a preset coding rule and generating a barcode image corresponding to the coding information; and publishing the barcode image on at least one region that users can contact.

Preferably, the mobile terminal, after encrypting the content of the service providing request message, sends the service providing request message to the backend server; and the backend server, after decrypting the content of the service providing request message, provides a service to the mobile terminal.

Preferably, the barcode image is a one-dimensional code, a two-dimensional code or a multi-dimensional code.

To achieve the first objective of the present invention, according to preferred embodiments of the present invention, the present invention provides a mobile terminal, wherein the mobile terminal has a wireless connection with a backend server by using a wireless network, the mobile terminal including: a camera, used for taking a picture of a barcode image; a decoder, used for decoding the taken barcode image to obtain coding information; a coding information parsing unit, used for parsing the coding information to determine whether the barcode image is generated according to a preset coding rule, and if the barcode image is generated according to the preset coding rule, further used for extracting corresponding service information according to the coding information; a sending/receiving unit, used for sending registration information to the backend server and receiving a registration success message from the backend server, if the barcode image is generated according to the preset coding rule, further used for sending a service providing request message to the backend server and receiving a service from the backend server, and if the barcode image is not generated according to the preset coding rule, further used for sending a webpage request message to a network browser and receiving a webpage corresponding to the coding information from the network browser; an input unit, used for inputting information required by the backend server; and a display unit, used for displaying information required by the backend server.

To achieve the first objective of the present invention, according to preferred embodiments of the present invention, the present invention provides a device utilizing barcode images for implementing communication, including: a mobile terminal and a backend server, the mobile terminal having a wireless connection with the backend server by using a wireless network, wherein the backend server includes: a barcode image generating unit, used for generating coding information corresponding to service information and generating a barcode image corresponding to the coding information; a first sending/receiving unit, used for receiving a service providing request message from the mobile terminal and providing a service to the mobile terminal, and further used for receiving registration information from the mobile terminal and sending a registration success message to the mobile terminal; and a user registration unit, used for completing user registration, and storing user registration information to a database; and the mobile terminal includes: a camera, used for taking a picture of the barcode image; a decoder, used for decoding the taken barcode image to obtain coding information; a coding information parsing unit, used for parsing the coding information to determine whether the barcode image is generated according to a preset coding rule, and if the barcode image is generated according to the preset coding rule, further used for extracting corresponding service information according to the coding information; a second sending/receiving unit, used for sending registration information to the backend server and receiving a registration success message from the backend server, if the barcode image is generated according to the preset coding rule, further used for sending a service providing request message to the backend server and receiving a service from the backend server, and if the barcode image is not generated according to the preset coding rule, further used for sending a webpage request message to a network browser and receiving a webpage corresponding to the coding information from the network browser; an input unit, used for inputting information required by the backend server; and a display unit, used for displaying information required by the backend server.

Preferably, the backend server further includes a database, used for storing the service information and the registration information.

Preferably, the mobile terminal has a viewfinder screen, and when the camera focuses on the barcode image and the barcode image is clear enough on the viewfinder screen, the camera automatically takes a picture of the barcode image.

Preferably, the mobile terminal further includes an encrypting unit, used for encrypting content of the service providing request message; and the backend server further includes a decrypting unit, used for decrypting the content of the service providing request message.

To achieve the second objective of the present invention, according to preferred embodiments of the present invention, the present invention provides a method utilizing barcode images to communicate between a mobile terminal and a backend server, wherein the mobile terminal has a wireless connection with the backend server by using a wireless network, the method including: registering a user of the mobile terminal as a user of the backend server, and the backend server storing registration information of the user, wherein the user has a unique username; taking a picture of the barcode image by using a camera disposed in the mobile terminal; decoding the taken barcode image by using the mobile terminal to obtain coding information; parsing the coding information to determine whether the barcode image is generated according to a preset coding rule, if the barcode image is generated according to the preset coding rule, executing subsequent steps, and if the barcode image is not generated according to the preset coding rule, stopping executing the method after the mobile terminal is connected to a webpage corresponding to the coding information; the mobile terminal extracting service information corresponding to the coding information according to the coding information; the mobile terminal combining the coding information with coding information corresponding to user information, to generate another barcode image, and sending the another barcode image to the backend server, wherein the user information at least includes information that can uniquely identify the mobile terminal; and the backend server decoding the another barcode image and providing a service to the mobile terminal.

Preferably, the method further includes: generating coding information corresponding to the service information according to a preset coding rule and generating a barcode image corresponding to the coding information; and publishing the barcode image on at least one region that users can contact.

To achieve the second objective of the present invention, according to preferred embodiments of the present invention, the present invention provides a mobile terminal, wherein the mobile terminal includes a barcode image generating unit, used for combining the coding information with coding information corresponding to user information, to generate another barcode image, wherein the user information at least includes information that can uniquely identify the mobile terminal.

Preferably, the mobile terminal further includes an encrypting unit, used for encrypting content of the service providing request message.

To achieve the second objective of the present invention, according to preferred embodiments of the present invention, the present invention provides a device utilizing barcode images for implementing communication, including a mobile terminal and a service providing device, the mobile terminal further including an another barcode image generating unit, used for combining the coding information with coding information corresponding to user information, to generate another barcode image, wherein the user information at least includes information that can uniquely identify the mobile terminal.

Preferably, the backend server further includes another decoder, used for decoding the another barcode image to obtain corresponding coding information.

To achieve the third objective of the present invention, according to preferred embodiments of the present invention, the present invention provides a method utilizing barcode images to communicate between a mobile terminal and a service providing device, wherein the mobile terminal has a connection with the service providing device through an interface of the mobile terminal, the method including: generating coding information corresponding to service information according to a preset coding rule and generating a barcode image corresponding to the coding information; publishing the barcode image on at least one region that users can contact; taking a picture of the barcode image by using a camera disposed in the mobile terminal; decoding the taken barcode image by using the mobile terminal to obtain coding information; parsing the coding information to determine whether the barcode image is generated according to a preset coding rule, if the barcode image is generated according to the preset coding rule, executing subsequent steps, and if the barcode image is not generated according to the preset coding rule, stopping executing the method after the mobile terminal is connected to a webpage corresponding to the coding information; the mobile terminal extracting service information corresponding to the coding information according to the coding information; the mobile terminal sending a service providing request message to the service providing device, the service providing request message at least including a telephone number of the mobile terminal and/or an IMEI (International Mobile Equipment Identity) number of the mobile terminal; and the service providing device providing a service to the mobile terminal according to content of the service providing request message.

Preferably, the interface is a USB interface, a memory card slot, an SIM card slot, an infrared interface or a Bluetooth interface.

To achieve the third objective of the present invention, according to preferred embodiments of the present invention, the present invention provides a mobile terminal, wherein the mobile terminal has a connection with a service providing device through an interface of the mobile terminal, the mobile terminal including: a camera, used for taking a picture of a barcode image; a decoder, used for decoding the taken barcode image to obtain coding information; a coding information parsing unit, used for parsing the coding information to determine whether the barcode image is generated according to a preset coding rule, and if the barcode image is generated according to the preset coding rule, further used for extracting corresponding service information according to the coding information; a sending/receiving unit, used for, if the barcode image is generated according to the preset coding rule, sending a service providing request message to the service providing device and receiving a service from the service providing device, and if the barcode image is not generated according to the preset coding rule, further used for sending a webpage request message to a network browser and receiving a webpage corresponding to the coding information from the network browser; an input unit, used for inputting information required by the backend server; and a display unit, used for displaying information required by the backend server.

Preferably, the mobile terminal has a viewfinder screen, and when the camera focuses on the barcode image and the barcode image is clear enough on the viewfinder screen, the camera automatically takes a picture of the barcode image.

To achieve the third objective of the present invention, according to preferred embodiments of the present invention, the present invention provides a device utilizing barcode images for implementing communication, including: a mobile terminal and a service providing device, the mobile terminal having a connection with the service providing device through an interface of the mobile terminal, wherein the service providing device includes a first sending/receiving unit, used for receiving a service providing request message from the mobile terminal and providing a service to the mobile terminal; and the mobile terminal includes: a camera, used for taking a picture of a barcode image; a decoder, used for decoding the taken barcode image to obtain coding information; a coding information parsing unit, used for parsing the coding information to determine whether the barcode image is generated according to a preset coding rule, and if the barcode image is generated according to the preset coding rule, further used for extracting corresponding service information according to the coding information; a second sending/receiving unit, used for, if the barcode image is generated according to the preset coding rule, sending a service providing request message to the service providing device and receiving a service from the service providing device, and if the barcode image is not generated according to the preset coding rule, further used for sending a webpage request message to a network browser and receiving a webpage corresponding to the coding information from the network browser; an input unit, used for inputting information required by the backend server; and a display unit, used for displaying information required by the backend server.

The communication methods, devices and the mobile terminals thereof of the present invention have the following beneficial effects:

Whether a barcode image is generated according to a preset coding rule, the communication methods, devices and the mobile terminals thereof according to preferred embodiments of the present invention can correctly interpret the barcode image. Even if the barcode image is not generated according to the preset coding rule, an URL address corresponding to the barcode image can be connected so as to obtain a webpage, but "Error" information may not appear on the mobile terminals. The communication methods, devices and the mobile terminals thereof according to preferred embodiments of the present invention can decode a barcode image of any code format, so that users of the mobile terminals could enjoy the service provided by the barcode image more conveniently.

The camera in the mobile terminal according to preferred embodiments of the present invention, when a barcode image in a viewfinder screen is clear enough, can automatically take a picture of the barcode image. This avoids a tedious step that may be caused by artificial shooting that the barcode image is blurry and the shooting must be repeated.

The communication methods, devices and the mobile terminals thereof according to preferred embodiments of the present invention could encrypt content of a message sent by the mobile terminal to the backend server, and decrypt the content of the message received by the backend server. Encryption and decryption of information can ensure data security, and are applicable to services requiring high data security such as payment services and voting services.

The communication methods, devices and the mobile terminals thereof according to preferred embodiments of the present invention could, based on the original barcode image, add user information and then generate a new barcode image by the mobile terminals. As the data security of the barcode image is extremely high, security of user information can be ensured without encryption and decryption.

The communication methods, devices and the mobile terminals thereof according to preferred embodiments of the present invention could complete, for example, purchase, payment and other services only at the mobile terminal without through a backend server. The service providing device can be connected with the mobile terminal through an interface matching the mobile terminal. In this way, even if there is no wireless network or a wireless network signal is poor, the service providing device can provide a service anytime anywhere.

The communication methods, devices and the mobile terminals thereof according to preferred embodiments of the present invention make the mobile terminal and the backend server work together to complete service providing. The mobile terminal not only sends a service providing request message to the backend server, but also can do part of the work of providing a service.

The concept, specific structure and technical effects generated of the present invention are further described below with reference to the accompanying drawings, so as to facilitate full understanding of the objectives, features and effects of the present invention.

DETAILED DESCRIPTION OF THE EMBODIMENTS

In the present invention, the barcode image may be a one-dimensional code, a two-dimensional code or a multi-dimensional code, as long as coding information corresponding to information related to services could be completely stored. Although the storage amount of a one-dimensional code information is limited, it is also feasible in theory. This text takes the two-dimensional code as an example below, to describe in detail the method, the mobile terminal and the device of the present invention.

Figure 1:
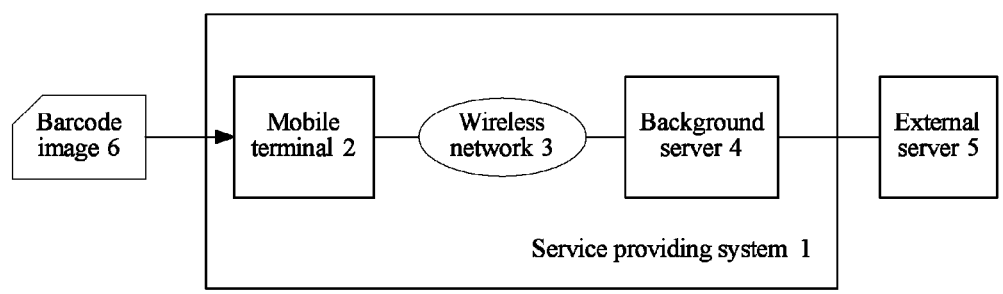
FIG. 1 is a structural block diagram of a first embodiment of a service providing system according to the present invention.

FIG. 1 shows a device utilizing barcode images for implementing communication according to the present invention, that is, FIG. 1 is a structural block diagram of a first embodiment of a service providing system 1. As shown in FIG. 1, the service providing system 1 includes a mobile terminal 2, a wireless network 3 and a backend server 4. The mobile terminal 2 has a wireless connection with the backend server 4 by using the wireless network 3. The backend server 4 communicates with an external server 5 through a wireless network or a wired network. The backend server 4 connects the external server 5 preferably through a wireless network. The wireless network may be a network such as a GPRS network, a 3G network, a 4G network, a WIFI network, or a Bluetooth network that can make the mobile terminal communicate with the backend server 4 at any time in a place where there is a network signal. The mobile terminal 2 takes a picture of a barcode image 6 through a built-in camera, decodes the taken barcode image 6, and requests service providing from the backend server 4 according to information obtained through decoding. According to a service type, the backend server 4 may provide a service to the mobile terminal 2 alone, or may cooperate with the external server 5 to provide a service to the mobile terminal 2.

As a preferred embodiment of the present invention, the mobile terminal 2 only needs to be a camera-equipped mobile terminal. The mobile terminal 2 can obtain client software through downloading, a storage card or other manners, and communicates with the backend server 4 through the client software upon completion of mounting. The mobile terminal 2 may be a camera-equipped mobile phone, a personal digital assistant (PDA) and so on.

Figure 2:
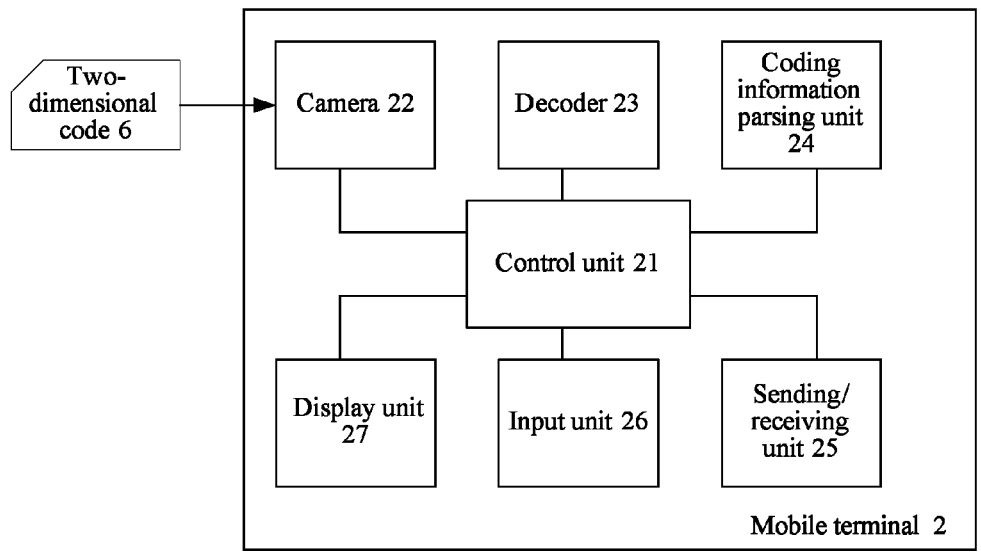
FIG. 2 is a structural block diagram of a first embodiment of the mobile terminal in FIG. 1.

FIG. 2 is a structural block diagram of a first embodiment of the mobile terminal 2 in FIG. 1. As shown in FIG. 2, the mobile terminal 2 includes a control unit 21, used for generating signals that control other units and controlling other units to achieve their respective functions. A camera 22, used for taking a picture of a two-dimensional code 6. Cameras having more than 300,000 pixels can clearly take a picture of the two-dimensional code 6. A decoder 23 is used for decoding the taken two-dimensional code 6 to obtain coding information. A coding information parsing unit 24 is used for parsing the coding information to determine whether the two-dimensional code 6 is generated according to a preset coding rule, and if the two-dimensional code 6 is generated according to the preset coding rule, the coding information parsing unit 24 is further used for extracting corresponding service information according to the coding information. A sending/receiving unit 25 is used for sending registration information to the backend server 4 and receiving a registration success message from the backend server 4 after registration is successful, if the two-dimensional code 6 is generated according to the preset coding rule, the sending/receiving unit 25 is further used for sending a service providing request message to the backend server 4 and receiving a service from the backend server 4, and if the two-dimensional code 6 is not generated according to the preset coding rule, the sending/receiving unit 25 is further used for sending a webpage request message to a network browser and receiving a webpage corresponding to the coding information from the network browser. An input unit 26 is used for inputting information required by the backend server 4. A display unit 27 is used for displaying information required by the backend server 4.

The coding information parsing unit 24 parses the coding information, to distinguish the coding rule of the two-dimensional code 6. If the coding rule of the two-dimensional code 6 is correspondingly consistent with that of the backend server 4, the sending/receiving unit 25 can communicate with the backend server 4, to obtain a desired service. If the coding rule of the two-dimensional code 6 is inconsistent with that of the backend server 4, similar to the service in the prior art, the mobile terminal 2 can automatically connect a web site corresponding to the two-dimensional code 6 to browse a webpage, but "Error" information may not appear on the display unit 27. Whether the coding rule of the two-dimensional code 6 is consistent with that of the backend server 4 or not, the mobile terminal 2 can correctly interpret the two-dimensional code 6. The mobile terminal 2 can decode the two-dimensional code 6 of any code format, so that the user of the mobile terminal 2 could enjoy the service provided by the two-dimensional code 6 more conveniently.

The input unit 26 can input registration information of the user, for example, username (that is, user ID), password, address, hobby, QQ number, payment account, and so on. The input unit 26 may serve as a selection required by the backend server 4. The input unit 26 may be a keyboard or a touch screen.

Correspondingly, the display unit 27 can display the registration information of the user, selection information required by the backend server 4 and prompt information.

Figure 3:
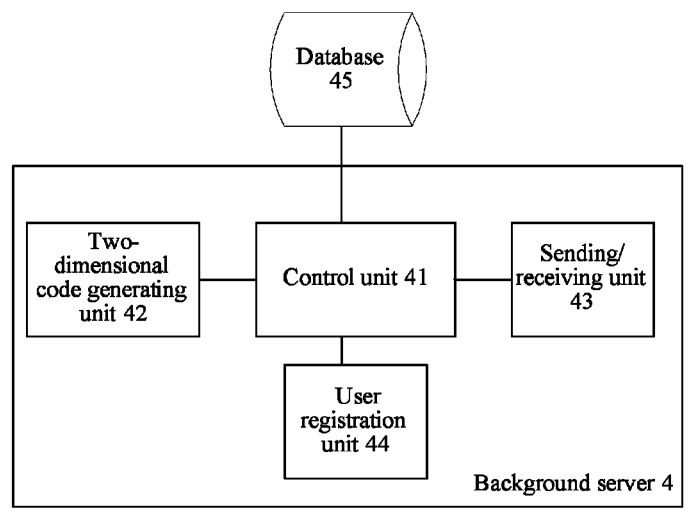
FIG. 3 is a structural block diagram of a first embodiment of the backend server in FIG. 1.

FIG. 3 is a structural block diagram of a first embodiment of the backend server 4 in FIG. 1. As shown in FIG. 3, the backend server 4 includes a control unit 41, used for generating signals that control other units and controlling other units to achieve their respective functions. A two-dimensional code generating unit 42 is used for generating coding information corresponding to service information and generating a two-dimensional code 6 corresponding to the coding information. A sending/receiving unit 43 is used for receiving a service providing request message from the mobile terminal 2 and providing a service to the mobile terminal 2, and is further used for receiving registration information from the mobile terminal 2 and sending a registration success message to the mobile terminal 2. A user registration unit 44 is used for completing user registration, and storing user registration information to an external database 45. The backend server 4 can call data in the database 45 at any time.

The two-dimensional code 6 for the mobile terminal 2 to take a picture can be generated by the two-dimensional code generating unit 42 of the backend server 4, or may be generated by an external two-dimensional code generating device. Certainly, the coding rule of the two-dimensional code generating unit 42 is consistent with that of the external two-dimensional code generating device.

Figure 4:
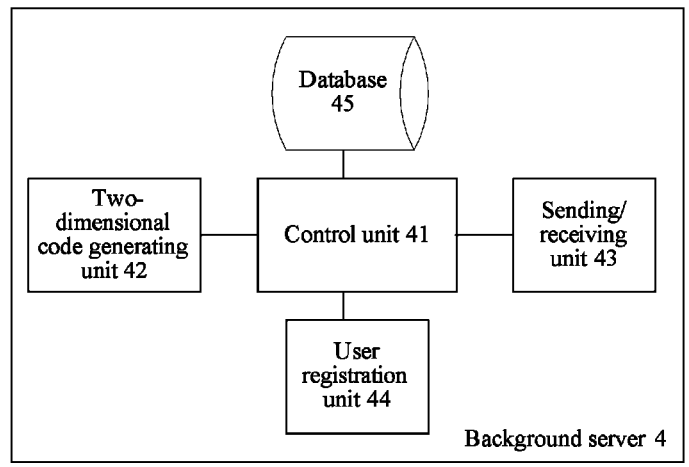
FIG. 4 is a structural block diagram of a second embodiment of the backend server in FIG. 1.

FIG. 4 is a structural block diagram of a second embodiment of the backend server 4 in FIG. 1. The difference between FIG. 4 and FIG. 3 lies in that, the database 45 in FIG. 3 is located outside the backend server 4, while the database 45 in FIG. 4 is located inside the backend server 4.

Figure 5:
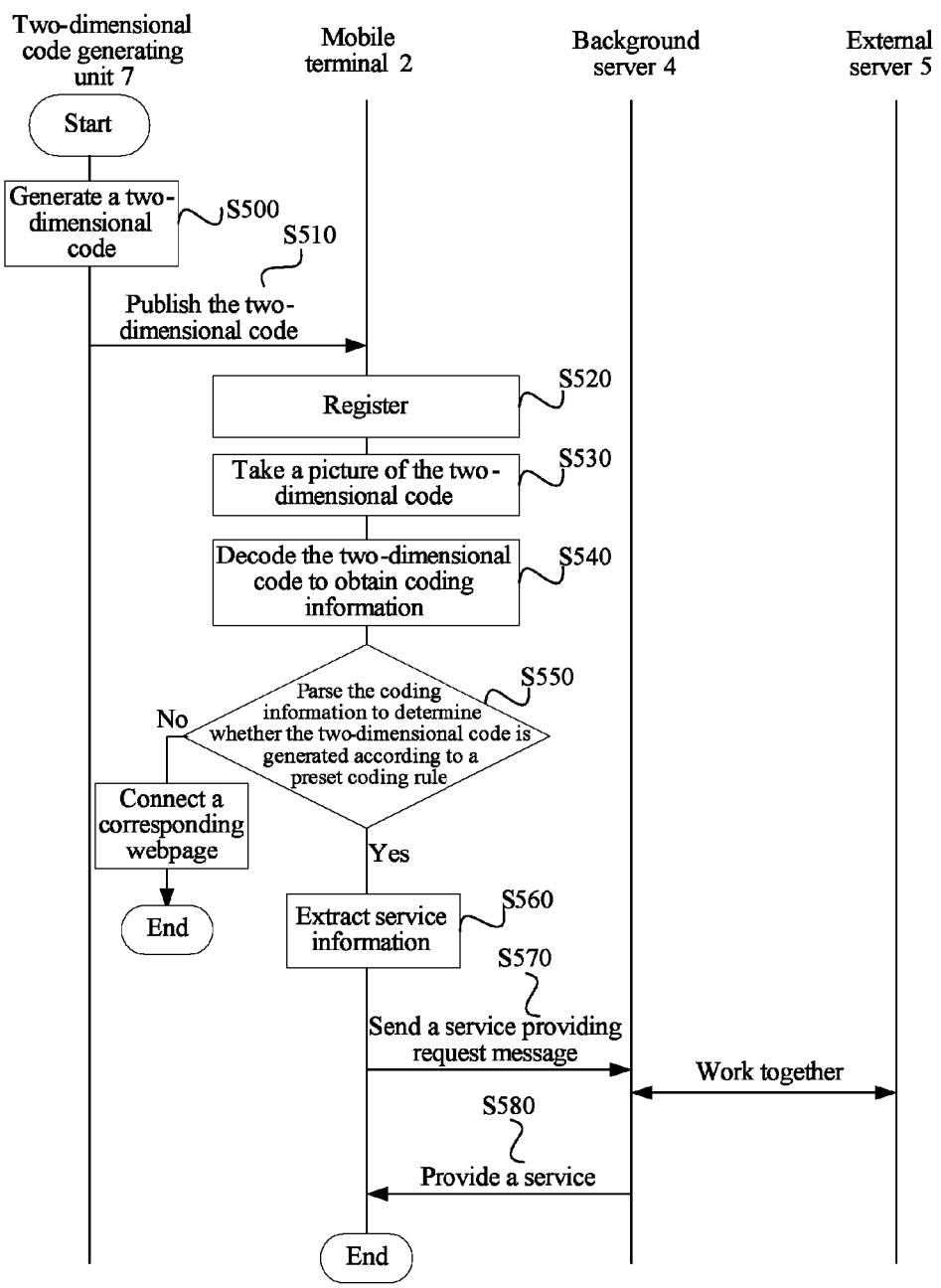
FIG. 5 is a flow chart of a first embodiment of a method utilizing barcode images to communicate between a mobile terminal and a backend server according to the present invention.

FIG. 5 is a flow chart of a first embodiment of a method for implementing communication between a mobile terminal 2 and a backend server 4 by using a barcode image according to the present invention. As shown in FIG. 5, in step S500, a two-dimensional code generating device 7 generates a two-dimensional code 6 according to a preset coding rule. According to a service provided by the backend server 4, generate corresponding coding information by using information related to the service according to a preset coding rule, and then generate a corresponding two-dimensional code 6 by using the coding information. The coding rule of the two-dimensional code generating device 7 is consistent with that of the backend server 4, and correspondingly matches the decoding rule of the mobile terminal 2.

In step S510, the two-dimensional code 6 is published on a place in the mobile terminal 2 that users can contact. For example, the two-dimensional code 6 can be published on a webpage of Internet, or by published on multiple information platforms such as sales catalogs, TV shopping screens, and building advertising media.

In step S520, a user is registered as a user of the backend server 4 through the mobile terminal 2, and the backend server 4 stores registration information of the user and sends a registration success message to the mobile terminal 2. The registration information at least includes a unique username and password. Certainly, the registration information also may include other personal information such as address, hobby, QQ number, and payment account.

In step S530, take a picture of the two-dimensional code 6 by using a camera disposed in the mobile terminal 2. The camera generally has 300,000 pixels or more than 300,000 pixels, which can ensure clarity of the two-dimensional code 6. When the camera focuses on the two-dimensional code 6 and the two-dimensional code 6 is clear enough on the viewfinder screen, the camera automatically takes a picture of the two-dimensional code 6.

In step S540, the mobile terminal 2 decodes the taken two-dimensional code 6 to obtain coding information corresponding to service information.

In step S550, the mobile terminal 2 parses the coding information to determine whether the two-dimensional code 6 is generated according to a preset coding rule, that is, to determine whether the two-dimensional code 6 is generated by the two-dimensional code generating device 7 or another device. If the two-dimensional code 6 is generated by the two-dimensional code generating device 7, the mobile terminal 2 can request obtaining the service provided by the backend server 4. If the two-dimensional code 6 is not generated by the two-dimensional code generating device 7, the mobile terminal 2 sends a webpage request message to a network browser, and the network browser sends a corresponding webpage to the mobile terminal 2, and displays it on a screen of the mobile terminal 2. If the two-dimensional code 6 is not generated by the two-dimensional code generating device 7, the method of this specific embodiment is no longer executed after the mobile terminal is connected to the corresponding webpage.

In step S560, the coding information is parsed, the mobile terminal 2 extracts from the backend server 4 service information stored in the database 45, and displays the information related to the service on the display screen of the mobile terminal 2, for the user to view.

In step S570, the mobile terminal 2 sends a service providing request message to the backend server 4, to request the backend server 4 to provide a service. The service providing request message at least includes information that can uniquely identify the mobile terminal 2. The information that can uniquely identify the mobile terminal 2 includes one or more of a telephone number of the mobile terminal 2, an IMEI number of the mobile terminal 2, a username and a physical address of an interface of the mobile terminal 2. The telephone number of the mobile terminal 2, the IMEI number of the mobile terminal 2, the username and the physical address of an interface of the mobile terminal 2 can serve as a unique user identifier, so that the backend server 4 can correctly identify the mobile terminal 2. Certainly, the service providing request message also may include other information that the backend server 4 considers necessary.

In step S580, the backend server 4 provides a service to the mobile terminal 2 according to content of the service providing request message. In this specific embodiment, the backend server 4 works together with an external server 5, to provide a service to the mobile terminal 2. Certainly, the mobile terminal 2 only communicates with the backend server 4, but does not directly communicate with the external server 5.

Figure 6:
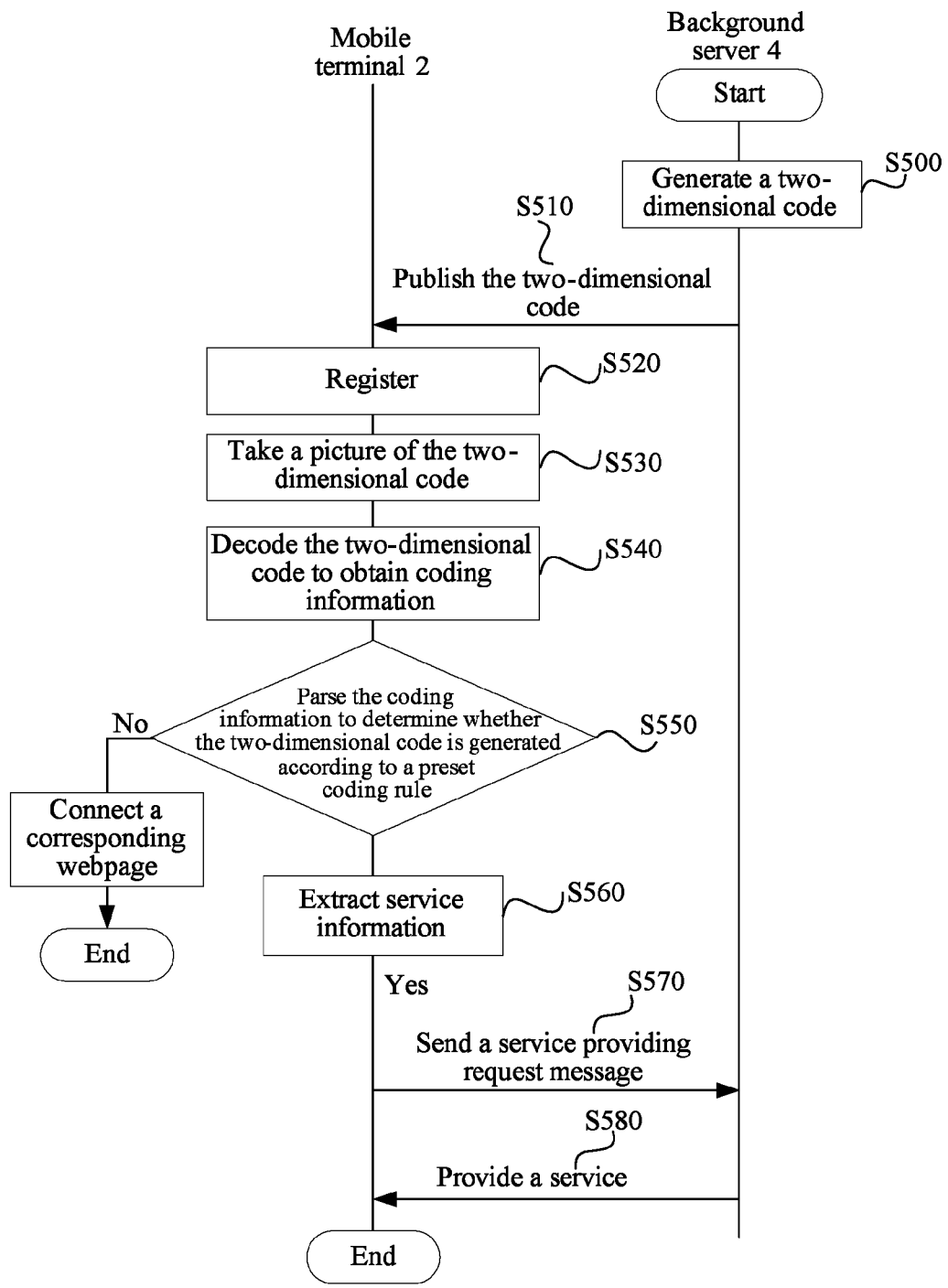
FIG. 6 is a flow chart of a second embodiment of the method utilizing barcode images to communicate between a mobile terminal and a backend server according to the present invention.

FIG. 6 is a flow chart of a second embodiment of the method for implementing communication between a mobile terminal 2 and a backend server 4 by using a barcode image according to the present invention. The difference between FIG. 6 and FIG. 5 lies in that, in FIG. 6, the two-dimensional code 6 is generated by the backend server 4, while in FIG. 5, the two-dimensional code 6 is generated by the two-dimensional code generating device 7. Besides, in FIG. 6, the backend server 4 provides a service to the mobile terminal 2 alone, while in FIG. 5, the backend server 4 needs to work together with the external server 5 to provide a service to the mobile terminal 2. Whether it is necessary to use the external server 5 is determined by the service type. For example, if it is a payment service, an external payment server is required to complete payment. If it is a content providing service, the backend server 4 can complete the content providing service alone only if it has sufficient content information.

Figure 7:
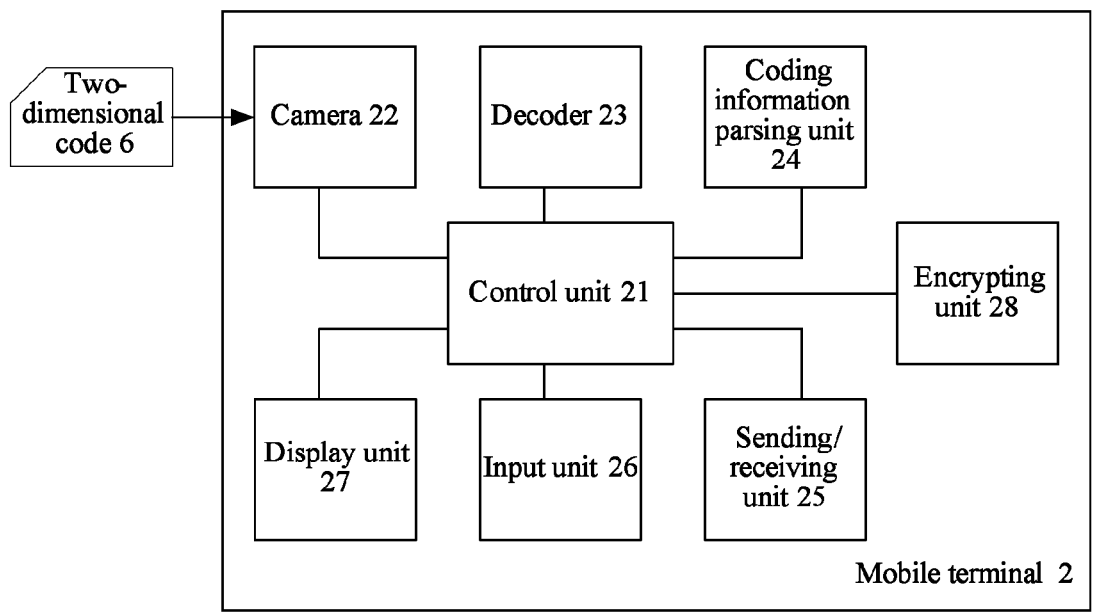
FIG. 7 is a structural block diagram of a second embodiment of the mobile terminal in FIG. 1.
Figure 8:
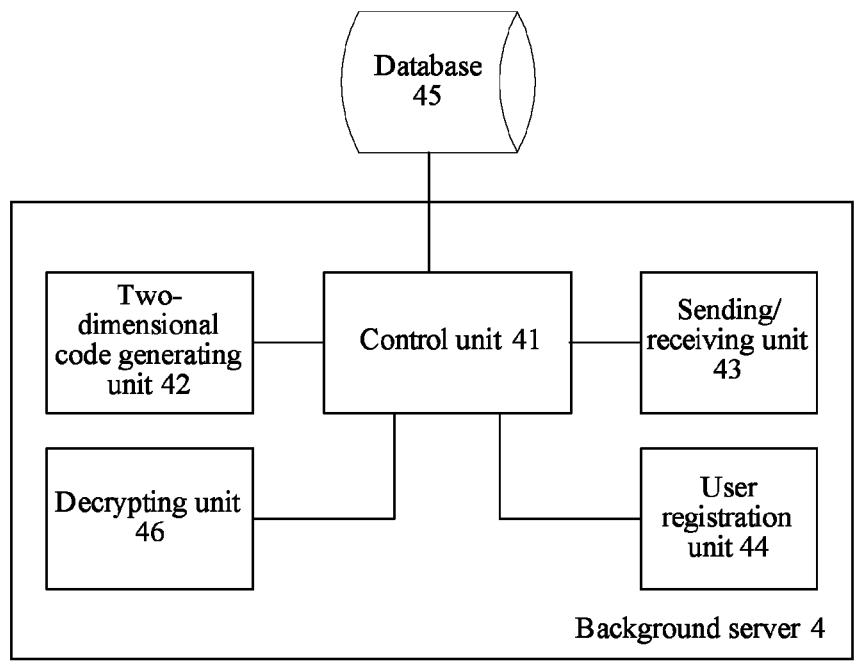
FIG. 8 is a structural block diagram of a third embodiment of the backend server in FIG. 1.

FIG. 7 is a structural block diagram of a second embodiment of the mobile terminal 2 in FIG. 1. The difference between FIG. 7 and FIG. 2 lies in that, FIG. 7 further includes an encrypting unit 28, used for encrypting content of the service providing request message sent by the mobile terminal 2 to the backend server 4. Correspondingly, as shown in FIG. 8, the difference between FIG. 8 and FIG. 3 lies in that, FIG. 8 further includes a decrypting unit 46, used for decrypting the content of the service providing request message. Encryption and decryption of information can ensure data security, and are applicable to services requiring high data security such as payment services and voting services.

Figure 9:
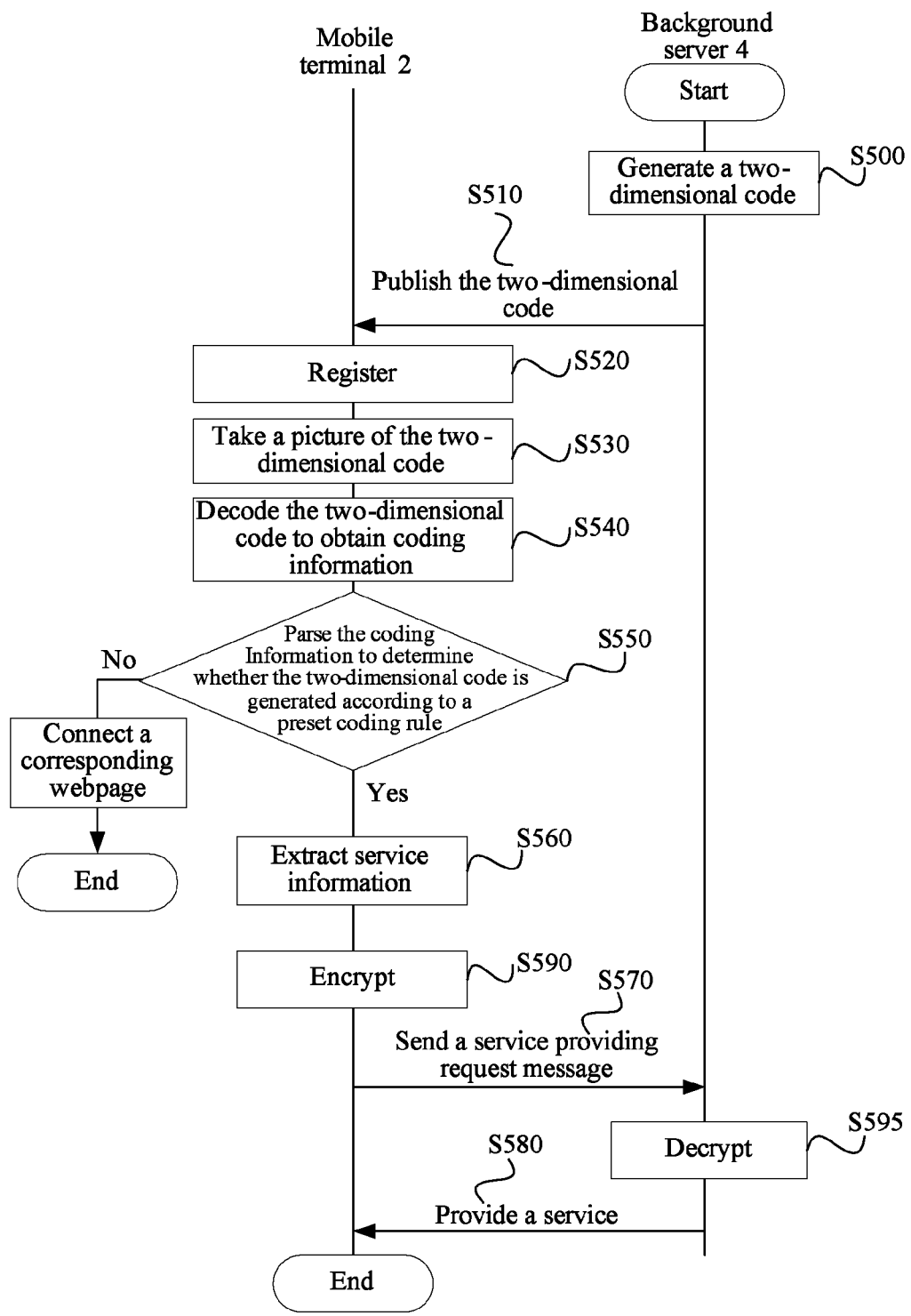
FIG. 9 is a flow chart of a third embodiment of the method utilizing barcode images to communicate between a mobile terminal and a backend server according to the present invention.

FIG. 9 is a flow chart of a third embodiment of the method for implementing communication between a mobile terminal 2 and a backend server 4 by using a barcode image according to the present invention. The difference between FIG. 9 and FIG. 6 lies in that, before step S570, step S590 is added, where the mobile terminal 2 encrypts content of the service providing request message. As the service providing request message includes personal information of the user, such as SIM card number and payment account, disclosure of such information is likely to cause great damage and distress to the user. Information encryption can greatly ensure security of user privacy. Correspondingly, before step S580, S595 is added, where the backend server 4 decrypts the content of the service providing request message.

The method for implementing communication between a mobile terminal 2 and a backend server 4 by using a barcode image according to the present invention is introduced in detail below by taking purchase and payment of a commodity as an example.

Figure 10:
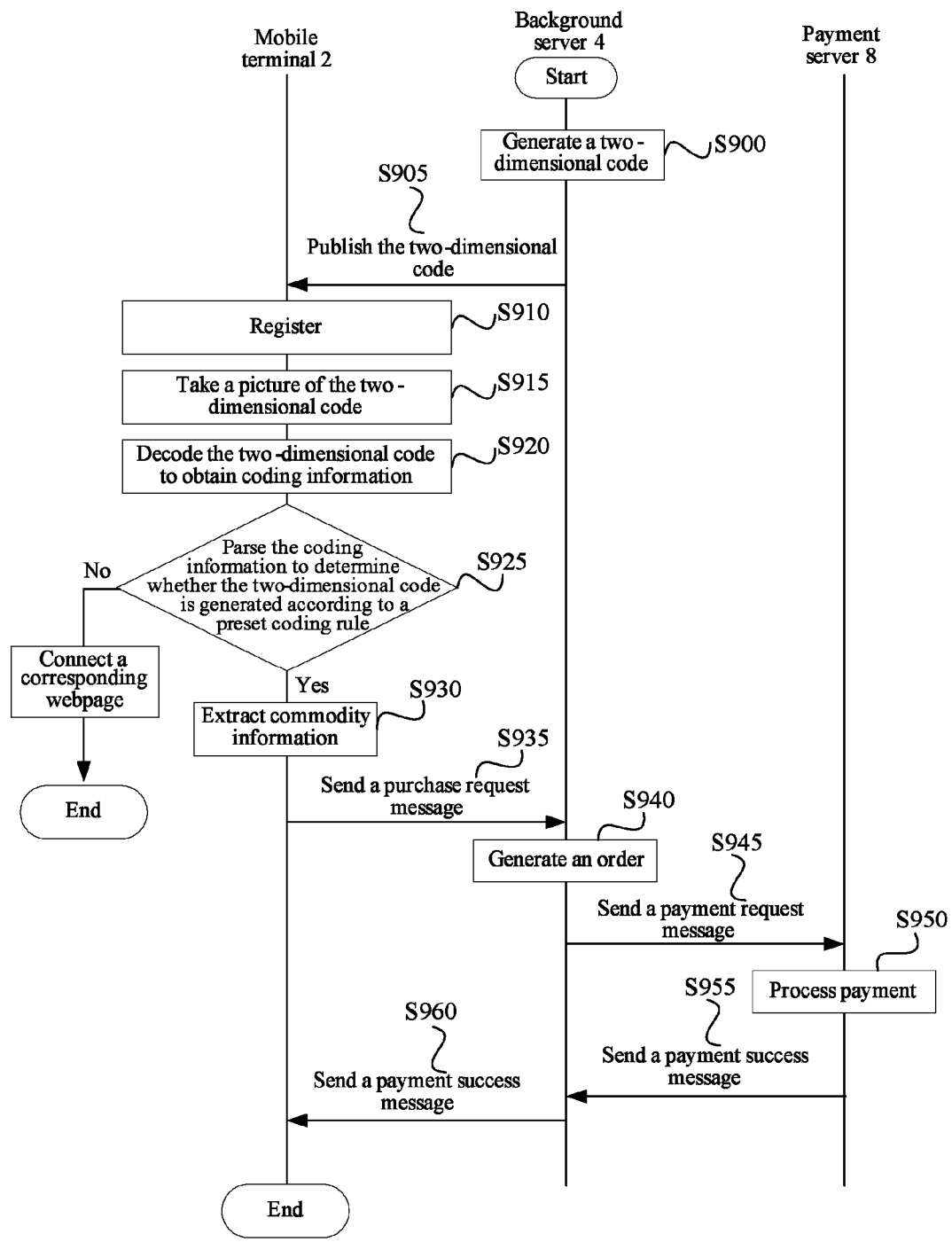
FIG. 10 is a flow chart of a fourth embodiment of the method utilizing barcode images to communicate between a mobile terminal and a backend server according to the present invention.

FIG. 10 is a flow chart of a fourth embodiment of the method for implementing communication between a mobile terminal 2 and a backend server 4 by using a barcode image according to the present invention.

In step S900, the backend server 4 encodes commodity information of a commodity, generates a two-dimensional code corresponding to the commodity information, and stores the commodity information into a database. The commodity information may include commodity code, commodity group, geographical GIS classification information, transaction price, sales organization, distribution channel, payment manner, receiving bank account number, third-party shroff account number and other commodity-related information.

In step S905, publish the two-dimensional code of the commodity on various information platforms.

In step S910, the user of the mobile terminal 2 inputs username and password, and is registered a user of the backend server 4, and the backend server 4 stores registration information of the user, and sends a registration success message to the mobile terminal 2.

In step S915, take a picture of the two-dimensional code of the commodity by using a camera disposed in the mobile terminal 2.

In step S920, decode the taken two-dimensional code to obtain coding information corresponding to the commodity information.

In step S925, parse the coding information to determine whether the two-dimensional code is generated according to a preset coding rule, that is, to determine whether the two-dimensional code is generated by the backend server 4 or another device. If the two-dimensional code is generated by the backend server 4, the mobile terminal 2 can request obtaining a service provided by the backend server 4. If the two-dimensional code is not generated by the backend server 4, that is, the two-dimensional code is a commodity of another business, execution of the method is ended after the mobile terminal 2 is connected to a webpage corresponding to the commodity.

In step S930, extract the commodity information from the backend server 4 according to the coding information, and display the commodity information on the mobile terminal 2, for the user to view.

In step S935, if the user is satisfied with the commodity, the user sends a purchase request message to the backend server 4. The purchase request message includes one or more of a telephone number of the mobile terminal 2, an IMEI number of the mobile terminal 2, a username and a physical address of an interface of the mobile terminal 2, and may further include other user information. The purchase request message further includes transaction information, such as purchase quantity and payment manner.

In step S940, the backend server 4 generates an order.

In step S945, the backend server 4 sends a payment request message to a payment server 8. The payment server 8 may be a payment server of a bank, a payment server of a mobile operator, a payment server of paypal, or the like.

In step S950, the payment server 8 processes payment, and completes payment for the commodity.

In step S955, the payment server 8 sends a payment success message to the backend server 4.

In step S960, the backend server 4 sends a payment success message to the mobile terminal 2, and displays the message on a display screen of the mobile terminal 2, to notify the user.

In this embodiment, the backend server 4 also may communicate with a server of a logistics corporation, to notify a delivery address. The backend server 4 also may communicate with a business, to notify success of commodity purchase and payment. The backend server 4 also may calculate the sales commission, for example, the commission of information platforms releasing two-dimensional codes.

The method in this embodiment can provide convenient e-commerce. As the mobile terminal 2 is internally provided with a camera, it is unnecessary to provide such additional hardware as a two-dimensional code reader. The two-dimensional code of the commodity contains, for example, order, payment-related information required by transaction management, and thus it is only necessary to trigger a series of subsequent transactions through such a simple action as shooting, to achieve a complicated whole process of the e-commerce and submit electronic transaction sheets. The method in this embodiment makes e-commerce go on all time (you can go shopping as long as you contact a two-dimensional code without going to a store), and accessible to everybody (foreigners can complete shopping in tourist attractions, Yiwu Small Commodity City purchase, TV shopping in foreign television stations and the like without translation and speaking Chinese).

The method in this embodiment can provide a safe payment method. As the two-dimensional code, the mobile terminal 2 and the backend server 4 all contain a preset coding rule, and thus a risk of leaking payment account may not happen as long as three parties are not infected by the same virus at the same time. In addition, in the method of this embodiment, it is only necessary to submit registration information to the backend server 4, and shopping can be done through two-dimensional codes on various information platforms. Thus, the risk can be evaded by avoiding repeatedly submitting personal information (especially payment information) to each shopping site.

The method in this embodiment can provide whole-staff direct-selling new sales channels and corresponding sales statistical analysis. As the two-dimensional code of the commodity contains information required by transaction management, manufacturers can make each employee in the company, for example, accountant in the finance department, become the company's direct salesman without changing the current sales mechanism. For example, commodity information includes channels, sales organizations, sales representatives, sales price, rebate percentage, and the like, each employee in the company can sell the two-dimensional code corresponding to the commodity information to friends and family, which thus can achieve e-commerce shopping. The backend server 4 can calculate rebate for each employee and make statistical analysis on sales of each channel.

Due to the wide distribution range of the two-dimensional code and mobile flexibility of the mobile terminal 2, users can make purchase and payment conveniently anytime anywhere. The method in this embodiment may definitely achieve great commercial success.

Figure 11:
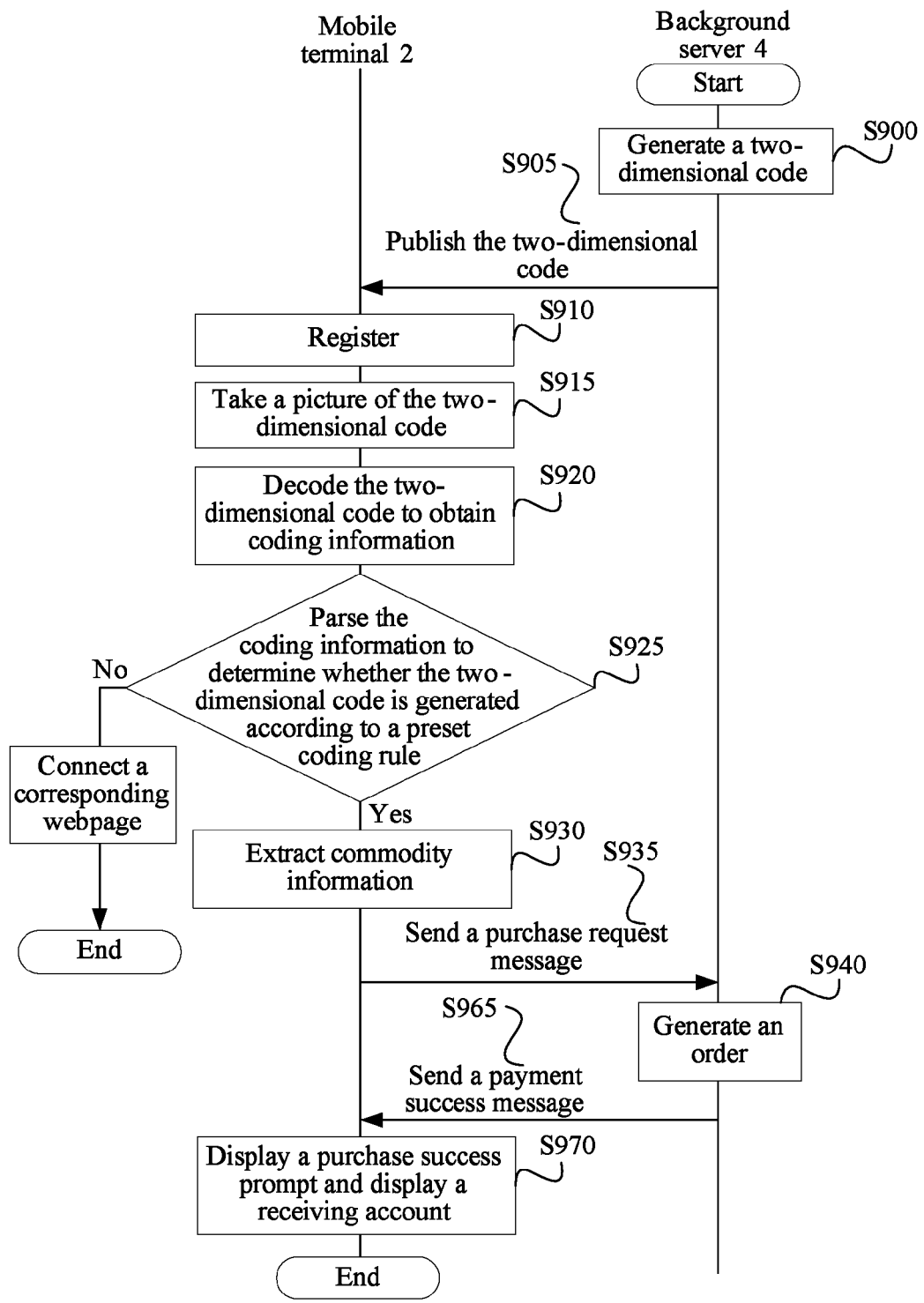
FIG. 11 is a flow chart of a fifth embodiment of the method utilizing barcode images to communicate between a mobile terminal and a backend server according to the present invention.

FIG. 11 is a flow chart of a fifth embodiment of the method for implementing communication between a mobile terminal 2 and a backend server 4 by using a barcode image according to the present invention. The difference between FIG. 11 and FIG. 10 lies in that, in FIG. 11, there is no payment server 8, and there is no need for an external payment server 8 to provide a payment service. After step S940, step S965 is performed, and the backend server 4 sends a purchase success message to the mobile terminal 2. In step S970, a prompt of purchase success is displayed on a display screen of the mobile terminal 2, and a receiving account is displayed. In this embodiment, only an order is generated, but the payment action is not executed. Users can complete payment by means of cash on delivery or online transfer. In this embodiment, the backend server 4 can complete the purchase service alone without participation of an external server. Although this embodiment is not as convenient as the method in the fourth embodiment, it can better ensure payment security. As an alternative shopping way, it also has broad prospects of commercial applications.

Figure 12:
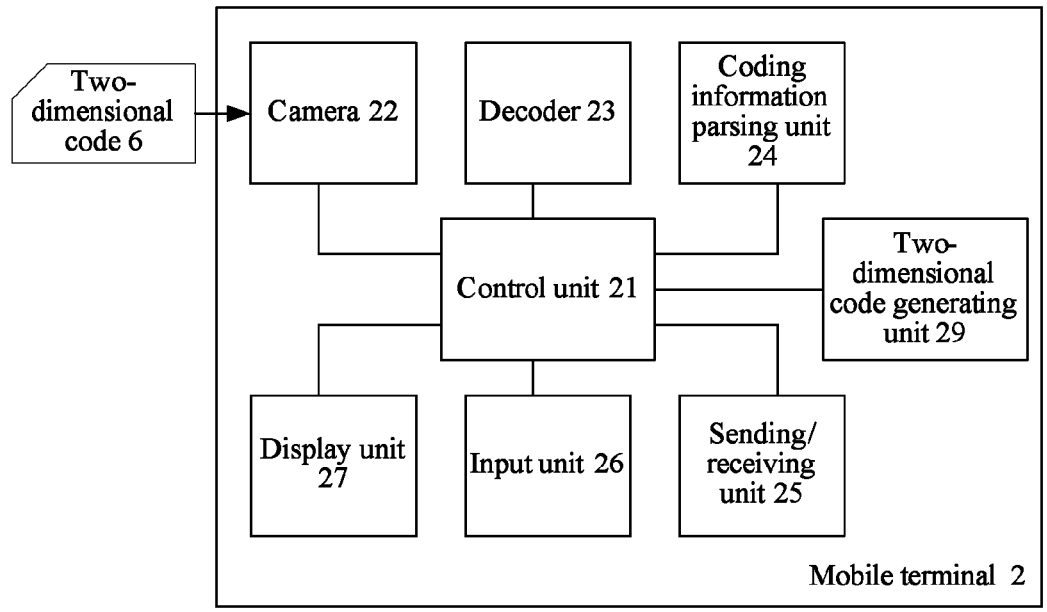
FIG. 12 is a structural block diagram of a third embodiment of the mobile terminal in FIG. 1.

FIG. 12 is a structural block diagram of a third embodiment of the mobile terminal 2 in FIG. 1. The difference between FIG. 12 and FIG. 2 lies in that, the mobile terminal 2 in FIG. 12 further includes a two-dimensional code generating unit 29, used for generating a new two-dimensional code. A two-dimensional code 6 is photographed by a camera 22, a decoder 23 decodes the two-dimensional code 6, and a coding information parsing unit, upon parsing, extracts service-related information contained in the two-dimensional code 6. The two-dimensional code generating unit 29, on the basis of the service-related information contained in the original two-dimensional code 6, adds user information, generates corresponding new coding information and then generates a corresponding new two-dimensional code. The user information at least includes one or more of a telephone number of the mobile terminal 2, an IMEI number of the mobile terminal 2, a username and a physical address of an interface of the mobile terminal 2, to uniquely identify the user of the mobile terminal 2. Certainly, the user information also should include other information related to the service provided by the backend server 4. Due to high security of the two-dimensional code, the user information is contained in the two-dimensional code to be transmitted to the backend server 4, and security of the user information can be ensured without encryption and decryption.

Figure 13:
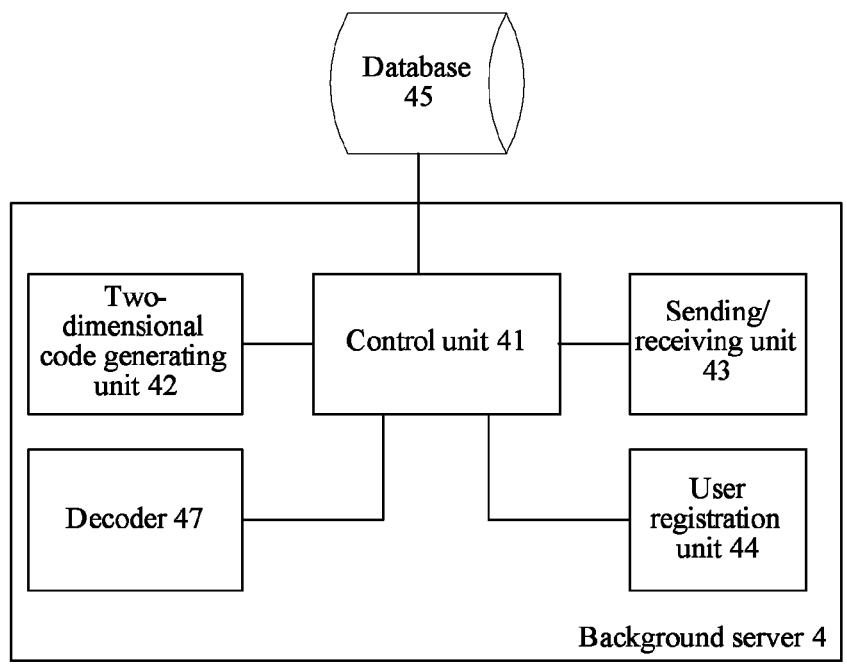
FIG. 13 is a structural block diagram of a fourth embodiment of the backend server in FIG. 1.

FIG. 13 is a structural block diagram of a fourth embodiment of the backend server 3 in FIG. 1. Corresponding to the mobile terminal 2 in FIG. 12, the backend server 4 in FIG. 13 has a decoder 47, to decode a new two-dimensional code generated by the mobile terminal 2, so as to extract user information contained in the new two-dimensional code.

Figure 14:
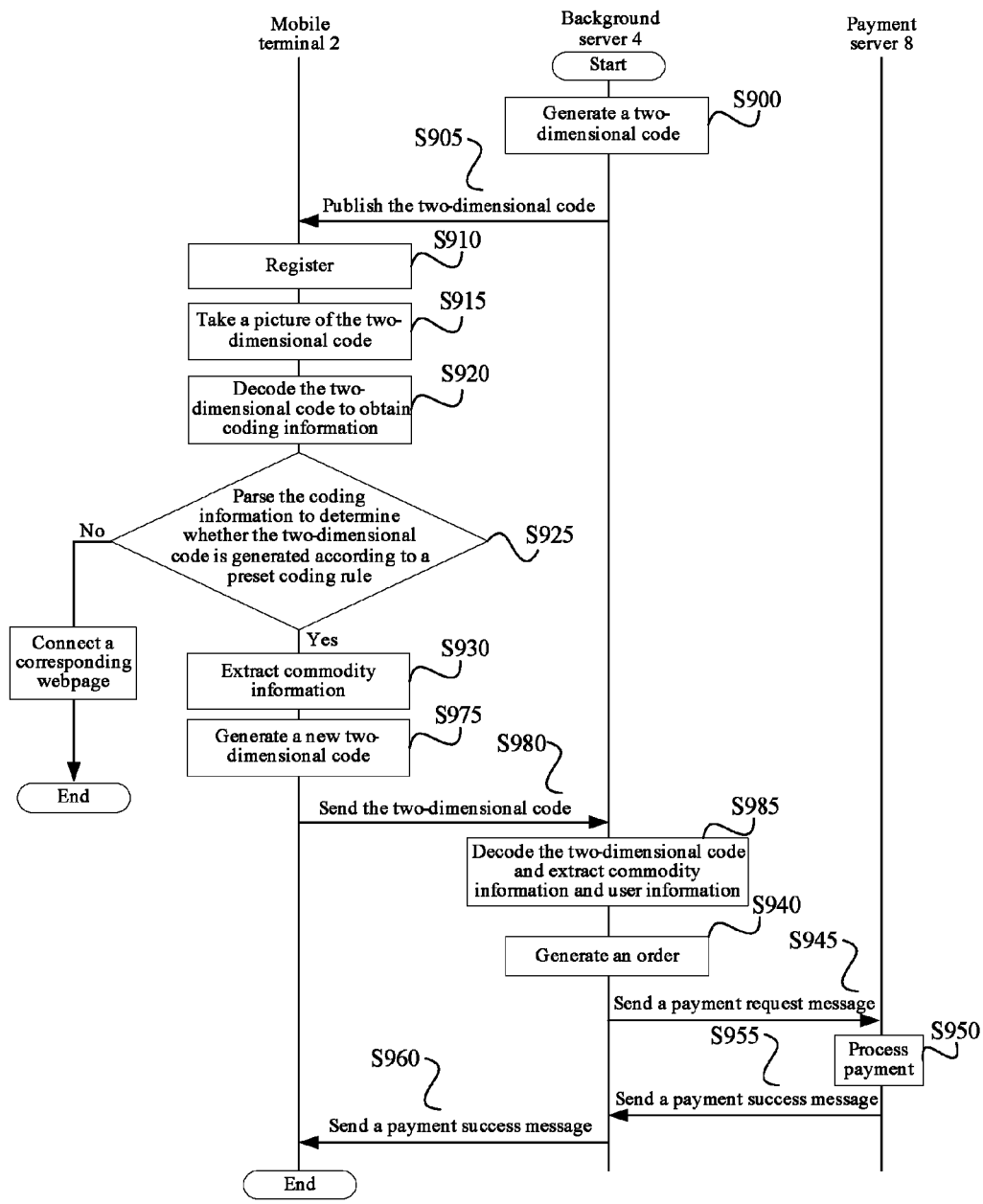
FIG. 14 is a flow chart of a sixth embodiment of the method utilizing barcode images to communicate between a mobile terminal and a backend server according to the present invention.

FIG. 14 is a flow chart of a sixth embodiment of the method for implementing communication between a mobile terminal 2 and a backend server 4 by using a barcode image according to the present invention. The difference between FIG. 14 and FIG. 10 lies in that, after step S930, a new step S975 is added, where the mobile terminal 2 combines the commodity information extracted in step S930 with user information (including transaction-related information, for example, the number of transactions), to generate a new two-dimensional code. In step S980, the mobile terminal 2 sends the generated new two-dimensional code to the backend server 4. In step S985, the backend server 4 decodes the new two-dimensional code, and extracts commodity information and additional user information.

Figure 15:
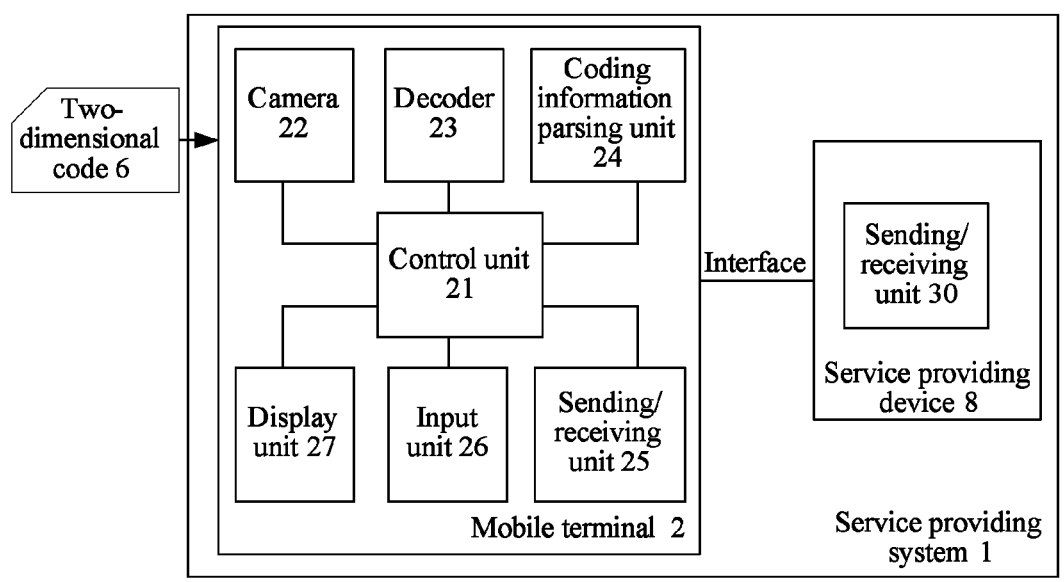
FIG. 15 is a structural block diagram of a second embodiment of the service providing system according to the present invention.

FIG. 15 is a structural block diagram of a second embodiment of the service providing system 1 according to the present invention. The service providing system 1 includes a mobile terminal 2 and a service providing device 8, and the mobile terminal 2 has a connection with the service providing device 8 through an interface of the mobile terminal 2.

The interface of the mobile terminal 2 may be a storage card slot, and the service providing device 8 is correspondingly an SD card capable of providing a scheduled service. The interface of the mobile terminal 2 may be a USB interface, and the service providing device 8 is correspondingly a USB device capable of providing a scheduled service. The interface of the mobile terminal 2 may be an SIM card slot, and the service providing device 8 is correspondingly an SIM card capable of providing a scheduled service. The interface of the mobile terminal 2 may be a wireless communication interface such as an infrared interface or a Bluetooth interface, and the service providing device 8 is correspondingly an infrared device or a Bluetooth device capable of providing a scheduled service. This embodiment has no limitation to the interface of the mobile terminal 2, and any interface of the mobile terminal 2 is applicable to this embodiment.

The mobile terminal 2 in FIG. 15 is identical to the mobile terminal in FIG. 2, which both include a control unit 21, a camera 22, a decoder 23, a coding information parsing unit 24, a sending/receiving unit 25, an input unit 26 and a display unit 27. The service providing device 8 includes a sending/receiving unit 30, used for receiving a service providing request message from the mobile terminal 2 and providing a service to the mobile terminal 2. The service providing device 8 is compact, and the user can carry it on. When the user needs to provide a service, the user can take out the service providing device 8 to connect the mobile terminal 2. Compared with the previous embodiment which needs a backend server 4, this embodiment has higher decision-making power on service providing. In the previous embodiment, as the backend server 4 and the mobile terminal 2 are connected via a wireless network, the backend server 4 cannot provide a service for the mobile terminal 2 in the case that there is no wireless network or a wireless network signal is poor. However, the service providing device 8 can provide a service anytime anywhere even if there is no wireless network.

Figure 16:
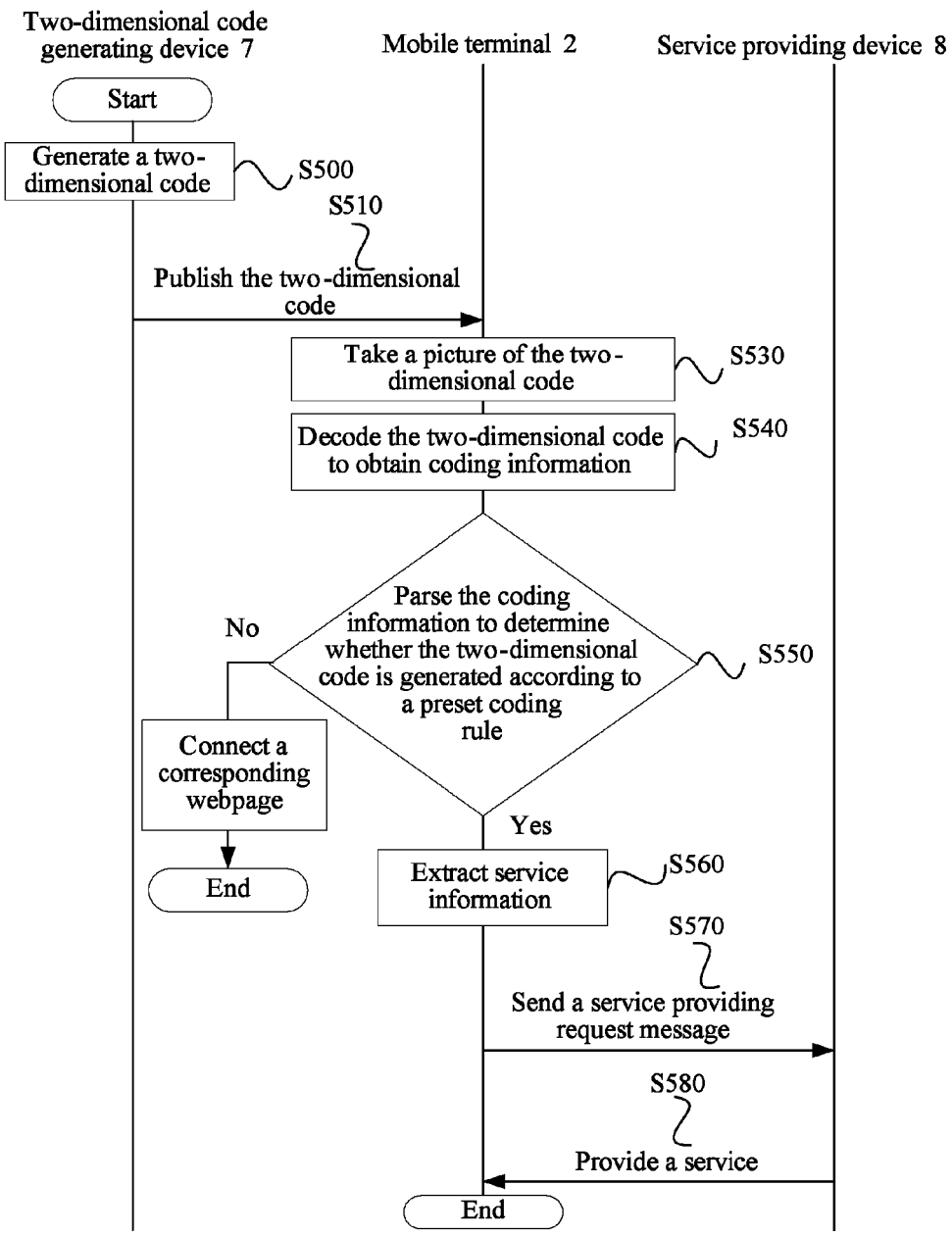
FIG. 16 is a flow chart of a first embodiment of a method utilizing barcode images to communicate between a mobile terminal and a service providing device according to the present invention.

FIG. 16 is a flow chart of a first embodiment of a method for implementing communication between a mobile terminal 2 and a service providing device 8 by using a barcode image according to the present invention. The difference between FIG. 16 and FIG. 5 lies in that, it is the service providing device 8 that provides a service in FIG. 16, and it is the backend server 4 that provides a service in FIG. 5. Besides, the service providing device 8 provides a service alone, which does not need participation of the external server 5.

In addition, step S520 is not needed in FIG. 16, that is, the mobile terminal 2 does not need to send registration information via a wireless network. However, the user of the mobile terminal 2 definitely needs to sign an agreement with a provider of the service providing device 8, to provide user information to the provider of the service providing device 8. Currently, such user information is provided in writing. For example, if the service providing device 8 is a transportation card, the provider is a bus company. For another example, if the service providing device 8 is an SIM card, the provider is a mobile operator. Certainly, this embodiment does not exclude that providing of user information can be transmitted via a wireless network in future.

Figure 17:
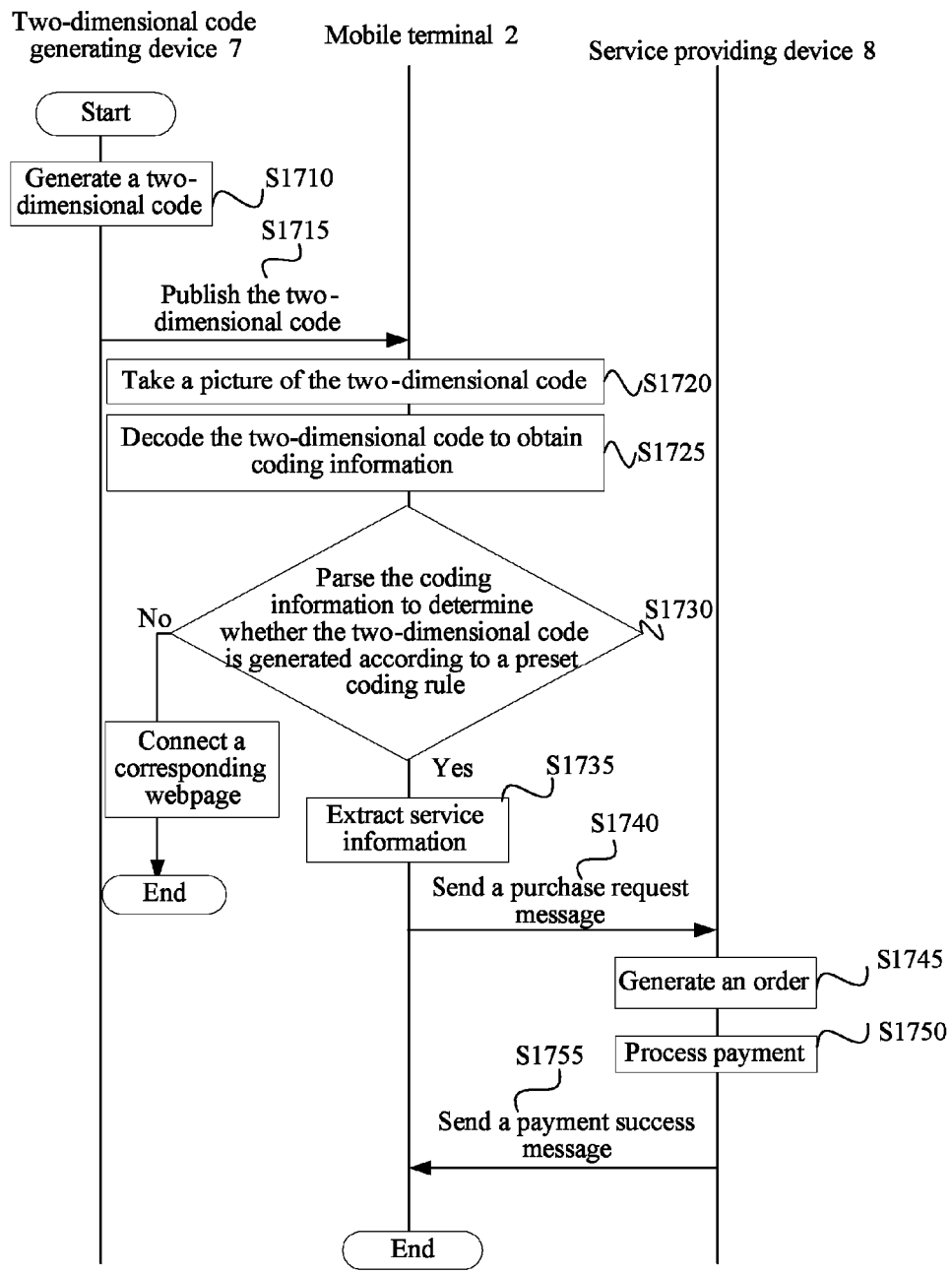
FIG. 17 is a flow chart of a second embodiment of the method utilizing barcode images to communicate between a mobile terminal and a service providing device according to the present invention.

FIG. 17 is a flow chart of a second embodiment of the method for implementing communication between a mobile terminal 2 and a service providing device 8 by using a barcode image according to the present invention.

In step S1710, a two-dimensional code generating device 7 generates a two-dimensional code 6 according to a preset coding rule.

In step S1715, the two-dimensional code 6 is published on a place in the mobile terminal 2 that users can contact.

In step S1720, take a picture of the two-dimensional code 6 by using a camera disposed in the mobile terminal 2.

In step S1725, the mobile terminal 2 decodes the taken two-dimensional code 6 to obtain coding information corresponding to service information.

In step S1730, the mobile terminal 2 parses the coding information to determine whether the two-dimensional code 6 is generated according to a preset coding rule, that is, to determine whether the two-dimensional code 6 is generated by the two-dimensional code generating device 7 or another device. If the two-dimensional code 6 is generated by the two-dimensional code generating device 7, the mobile terminal 2 can request obtaining a service provided by the service providing device 8. If the two-dimensional code 6 is not generated by the two-dimensional code generating device 7, the method in this specific embodiment is no longer executed after the mobile terminal 2 is connected to a corresponding webpage.

In step S1735, the coding information is parsed, and the mobile terminal 2 extracts stored commodity information from the service providing device 8, and displays information related to the service on a display screen of the mobile terminal 2, for users to view.

In step S1740, the mobile terminal 2 sends a purchase request message to the service providing device 8. As the mobile terminal 2 is directly connected with the service providing device 8, the purchase request message does not need to contain information that can uniquely identify the mobile terminal 2, for example, a telephone number of the mobile terminal 2, an IMEI number of the mobile terminal 2 or a physical address of an interface of the mobile terminal 2. Certainly, this embodiment makes no limitations thereto, and the purchase request message may include one or more of a telephone number of the mobile terminal 2, an IMEI number of the mobile terminal 2, and a physical address of an interface of the mobile terminal 2.

In step S1745, the service providing device 8 generates an order.

In step S1750, the service providing device 8 processes payment. For example, if the service providing device 8 is a bus card, corresponding money is directly deducted from the bus card. If the money is insufficient, the service providing device 8 may prompt the mobile terminal 2. For example, if the service providing device 8 is an SIM card, corresponding money is directly deducted from the calling charge of the SIM card, or the mobile operator generates a bill. This embodiment does not make limitations to the service providing device 8, and any device that can connect the mobile terminal 2 through an interface and can store funds falls within the scope of this embodiment.

In step S1755, the service providing device 8 sends a payment success message to the mobile terminal 2, and displays the payment success message on a display screen on the mobile terminal 2.

The communication method in this embodiment could complete, for example, purchase, payment and other services only at the mobile terminal without through a backend server. In this way, even if there is no wireless network or a wireless network signal is poor, the service providing device 8 can provide a service anytime anywhere.

Figure 18:
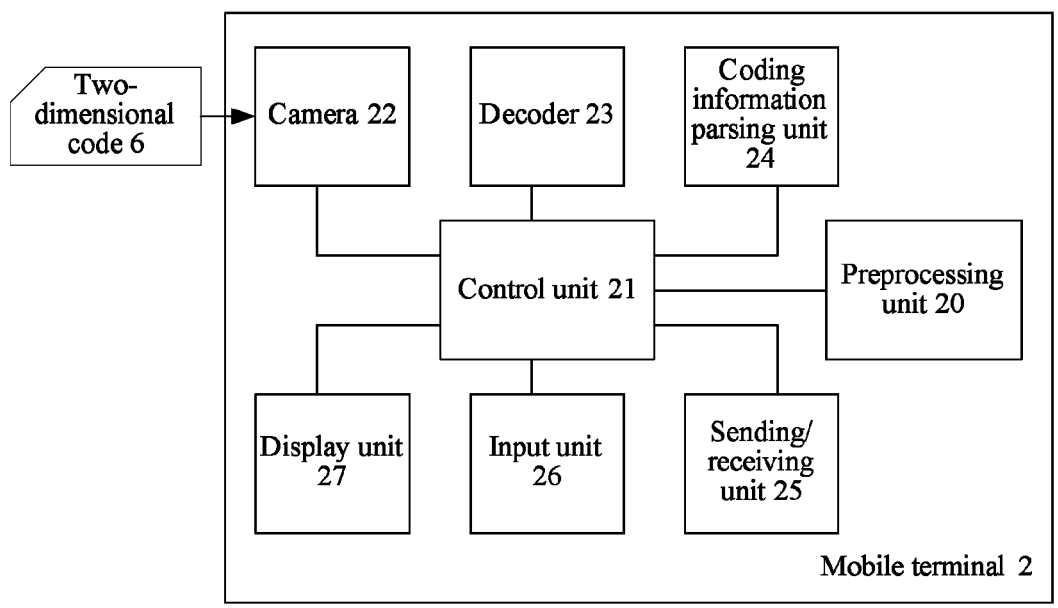
FIG. 18 is a structural block diagram of a fourth embodiment of the mobile terminal in FIG. 1.

FIG. 18 is a structural block diagram of a fourth embodiment of the mobile terminal in FIG. 1. The difference between FIG. 18 and FIG. 7 lies in that, the mobile terminal 2 in this embodiment includes a preprocessing unit 20, used for preprocessing a service to be provided to a user of the mobile terminal. In this embodiment, the mobile terminal 2 also processes a service provided to the user of the mobile terminal 2, that is, service providing is not completed by the backend server 4 alone, and the mobile terminal 2 per se can preprocess the provided service the mobile terminal 2 completes service providing for the user of the mobile terminal 2 together with the backend server 4.

Figure 19:
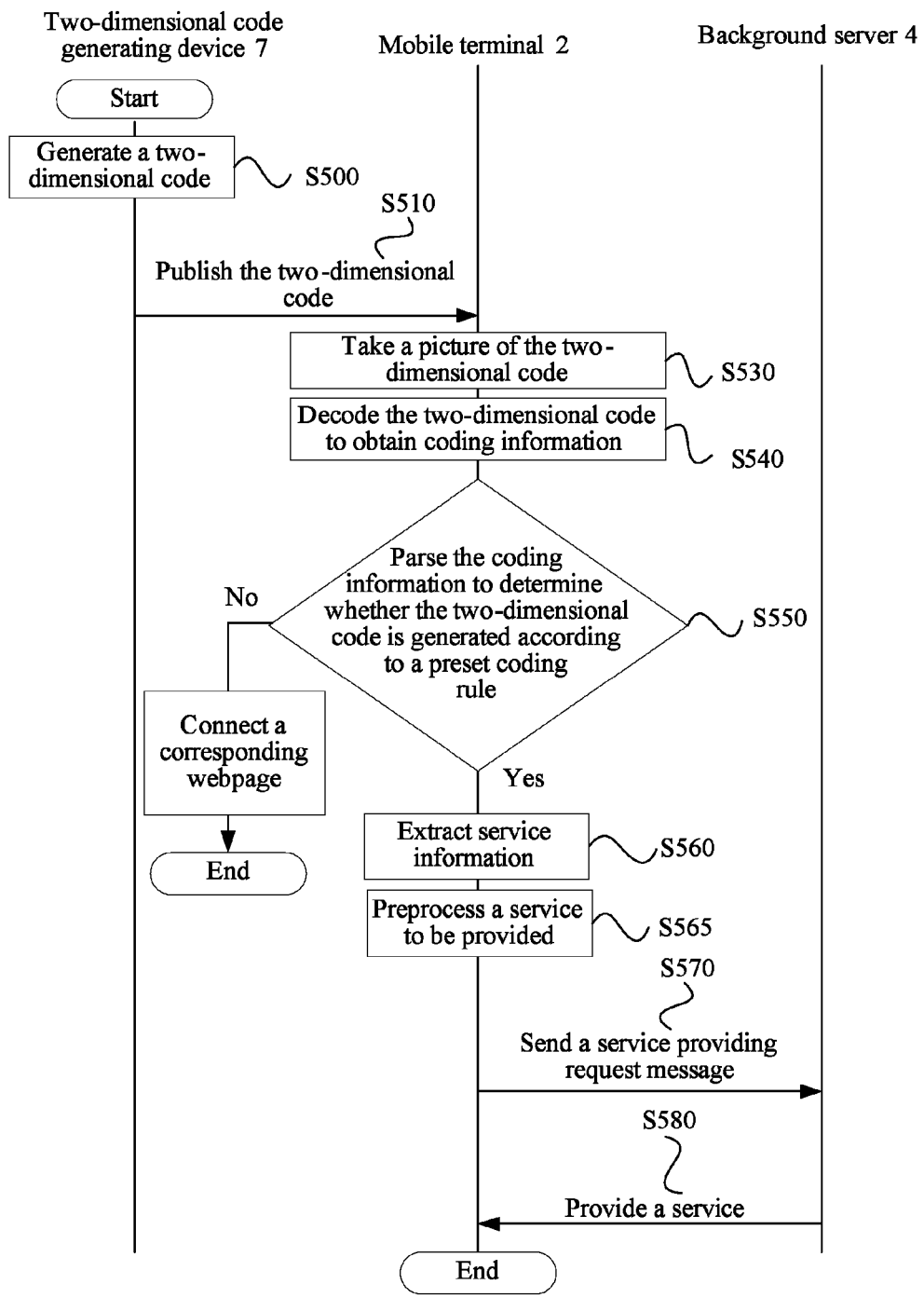
FIG. 19 is a flow chart of a seventh embodiment of the method utilizing barcode images to communicate between a mobile terminal and a backend server according to the present invention.

FIG. 19 is a flow chart of a seventh embodiment of the method utilizing barcode images to communicate between a mobile terminal and a backend server according to the present invention. The difference between FIG. 19 and FIG. 5 lies in that, in FIG. 19, after step S560 where service information is extracted, step S565 is added where the mobile terminal 2 preprocesses a service to be provided to a user of the mobile terminal 2 according to the service information extracted in step S560. Upon completion of preprocessing, the mobile terminal 2 sends a service providing request message again to the backend server 4, to request the backend server 4 to provide a further service.

Figure 20:
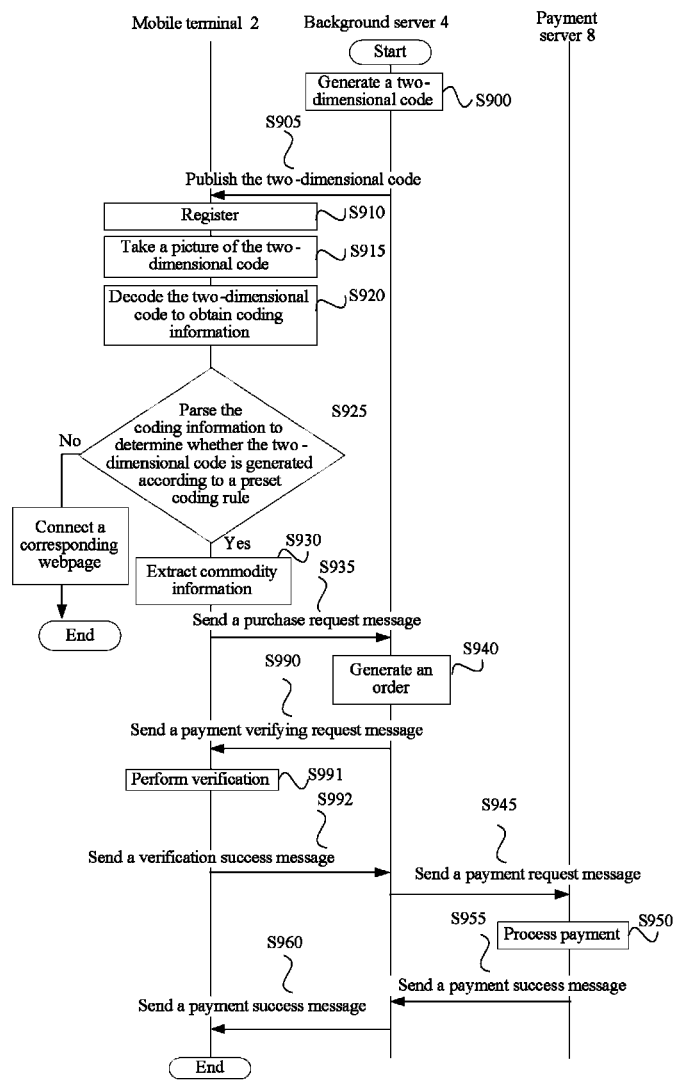
FIG. 20 is a flow chart of an eighth embodiment of the method utilizing barcode images to communicate between a mobile terminal and a backend server according to the present invention.

FIG. 20 is a flow chart of an eighth embodiment of the method utilizing barcode images to communicate between a mobile terminal and a backend server according to the present invention. In this embodiment, a digital certificate issued by a bank is inserted into a storage card interface of the mobile terminal 2. The digital certificate sets up association with the mobile terminal 2, for example, the digital certificate is bonded to the telephone number of the mobile terminal 2 and/or the IMEI number of the mobile terminal 2. The backend server 4 can notify the payment server 8 to deduct money from a bank account of a user of the associated mobile terminal 2 only if the digital certificate is inserted in the storage card interface of the associated mobile terminal 2.

The difference between FIG. 20 and FIG. 10 lies in that, in step S940, that is, after the backend server 4 generates an order, in step S990, the backend server 4 sends a payment verifying request message to the mobile terminal 2, to verify whether it is a mobile terminal 2 associated with the digital certificate.

In step S991, verify whether the mobile terminal 2 is associated with the digital certificate.

In step S992, if the mobile terminal 2 is associated with the digital certificate, the mobile terminal 2 sends a verification success message to the backend server 4.

The subsequent steps are identical to those in FIG. 10, and the backend server 4 and the payment server 8 complete the payment service.

In this embodiment, the mobile terminal 2 participates in the payment service, and association between the mobile terminal 2 and the digital certificate is determined. Through this embodiment, the user of the mobile terminal 2 neither needs to use a credit card nor needs to leak a bank card number to the business, which greatly ensures security of a bank card.

Figure 21:
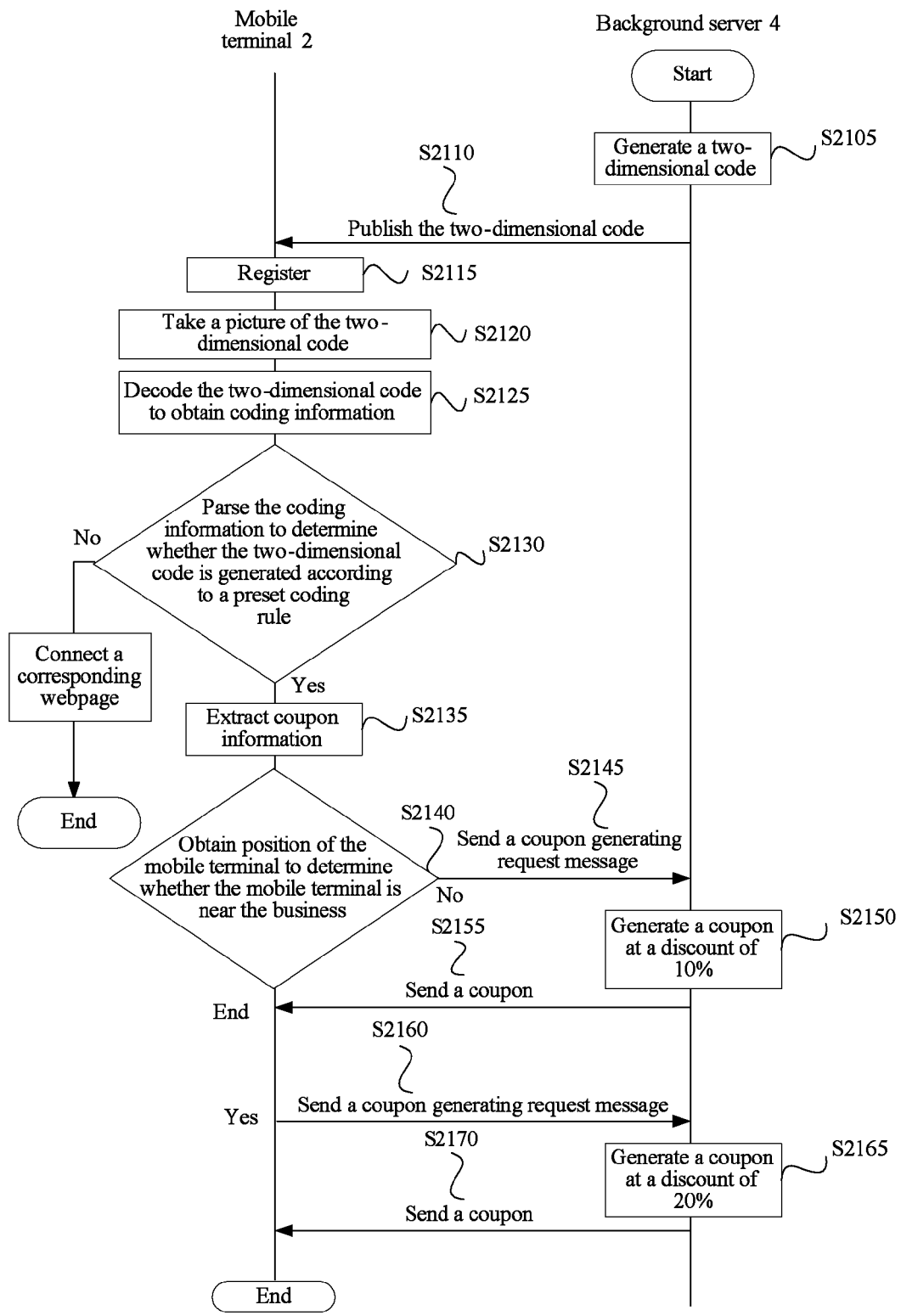
FIG. 21 is a flow chart of a ninth embodiment of the method utilizing barcode images to communicate between a mobile terminal and a backend server according to the present invention.

FIG. 21 is a flow chart of a ninth embodiment of the method utilizing barcode images to communicate between a mobile terminal and a backend server according to the present invention.

Step S2105 to step S2130 are identical to step S900 to step S925 in FIG. 20. In step S2135, the mobile terminal 2 extracts coupon information from the coding information.

In step S2140, a positioning unit in the mobile terminal 2 obtains position of the mobile terminal 2, to determine whether the mobile terminal 2 is near the business. The positioning unit may be a GPS module or a WIFI module, and the embodiment of the present invention makes no limitations thereto, as long as it is a function module that can obtain the position of the mobile terminal 2.

If the mobile terminal 2 is not near the business, in step S2145, the mobile terminal 2 sends a coupon generating request message to the backend server 4. In step S2150, as the mobile terminal 2 is not near the business, the possibility of occurrence of a consuming act is dim, and the backend server 4 generates a coupon at a discount of 10%, sends the coupon to the mobile terminal 2 in step S2155, and displays the coupon on a display screen of the mobile terminal 2.

If the mobile terminal 2 is near the business, in step S2160, the mobile terminal 2 sends a coupon generating request message to the backend server 4. In step S2165, as the mobile terminal 2 is near the business, the possibility of occurrence of a consuming act is large, the backend server 4 generates a coupon at a discount of 20%, sends the coupon to the mobile terminal 2 in step S2170, and displays the coupon on a display screen of the mobile terminal 2.

In this embodiment, the mobile terminal 2 participates in the coupon providing service, and the position of the mobile terminal is obtained and determined. The mobile terminal 2 and the backend server 4 work together, to complete the coupon providing service.

Figure 22:
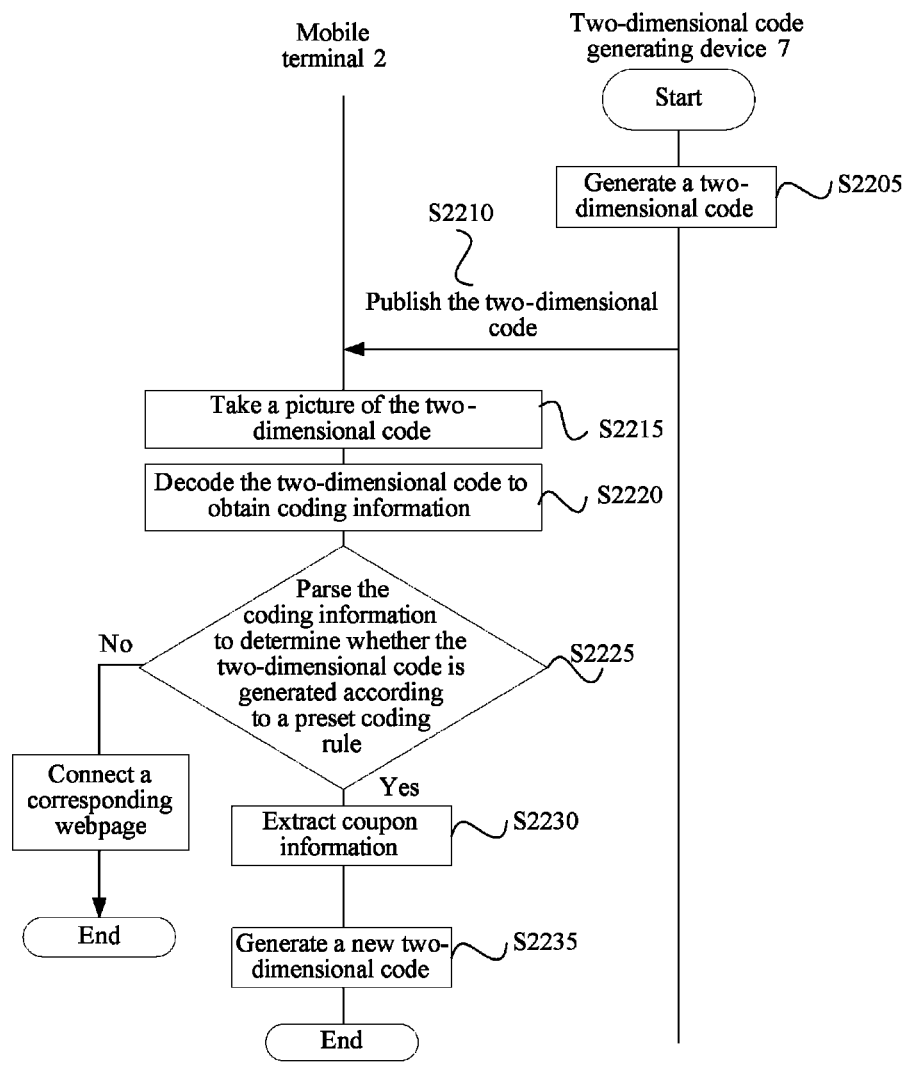
FIG. 22 is a flow chart of a preferred embodiment of a method for second-generating a barcode image in a mobile terminal according to the present invention.

FIG. 22 is a flow chart of a preferred embodiment of a method for second-generating a barcode image in a mobile terminal according to the present invention. In step S2205, a two-dimensional code generating device 7 generates a two-dimensional code by using coupon information according to a preset coding rule.

In step S2210, the two-dimensional code is published on a place in the mobile terminal 2 that users can contact.

In step S2215, take a picture of the two-dimensional code by using a camera disposed in the mobile terminal 2.

In step S2220, the mobile terminal 2 decodes the taken two-dimensional code to obtain coding information corresponding to the coupon information.

In step S2225, the mobile terminal 2 parses the coding information to determine whether the two-dimensional code is generated according to a preset coding rule, that is, to determine whether the two-dimensional code is generated by the two-dimensional code generating device 7 or another device. If the two-dimensional code is not generated by the two-dimensional code generating device 7, the method in this specific embodiment is no longer executed after the mobile terminal 2 is connected to a corresponding webpage.

In step S2230, if the two-dimensional code is generated by the two-dimensional code generating device 7, the mobile terminal 2 extracts corresponding coupon information from the coding information.

In step S2235, the mobile terminal 2, on the basis of the original coupon information, adds user information, generates a new two-dimensional code and displays the new two-dimensional code on a display screen of the mobile terminal 2. The user information at least includes one or more of a telephone number of the mobile terminal 2, an IMEI number of the mobile terminal 2, a username and a physical address of an interface of the mobile terminal 2, to uniquely identify the user of the mobile terminal 2. Certainly, the user information also may include other information related to the coupon information.

The user of the mobile terminal 2 can go to the business office to consume, and show the merchant the new two-dimensional code. The new two-dimensional code is scanned and decoded through a two-dimensional code scanner at the business, and the merchant can obtain coupon information and user information, to verify authenticity of the coupon.

As a preferred embodiment of the present invention, it is feasible that the registration step of the user of the mobile terminal 2 is executed before the mobile terminal 2 communicates with the backend server 4, for example, the registration step of the user of the mobile terminal 2 can be behind the step of extracting service information. Certainly, the registration step of the user of the mobile terminal 2 also may be executed before the step that the two-dimensional code generating device 7 or the backend server 4 generates a two-dimensional code.

As a preferred embodiment of the present invention, the user of the mobile terminal 2 certainly can perform user registration without through the mobile terminal 2. For example, user registration can be completed through a personal computer, for example, a desktop computer or a notebook computer. Certainly, the desktop computer or notebook computer must be able to communicate with the backend server 4.

The above describes preferred specific embodiments of the present invention in detail. It should be understood that, persons of ordinary skill in the art can make lots of modifications and variations according to the concept of the present invention without creative efforts. Therefore, any technical solution that persons skilled in the art can obtain through logical analysis, reasoning or a finite number of experiments on the basis of the prior art according to the concept of the present invention should fall within the scope as defined by the claims.

What is claimed is:

1. A method of utilizing barcode images to communicate between a mobile terminal and a backend server, said mobile terminal having a wireless connection with said backend server, by using a wireless network, wherein, said method comprises:

a user of said mobile terminal registering as a user of said backend server, and said backend server storing registration information of said user, said user having a unique username;

taking a picture of said barcode image with a camera disposed in the said mobile terminal;

decoding the taken barcode image using said mobile terminal to obtain coding information; and parsing said coding information to determine, as a first determination, whether said barcode image is generated according to a preset coding rule, the preset coding rule specifying barcode information generated by or uniquely associated with the backend server with which the user of said mobile terminal has registered, wherein, only when according to the first determination it is determined that said barcode image is generated according to the preset coding rule, subsequent steps (a)-(c) are executed, and wherein when it is determined according to the first determination that the barcode image was not generated according to the preset coding rule, connecting said mobile terminal to a webpage corresponding to the coding information, and steps (a)-(c) are not executed;

(a) according to said coding information, extracting service information corresponding to said coding information using said mobile terminal;

(b) sending from said mobile terminal a service providing request message to said backend server, said service providing request message at least including information that uniquely identifies said mobile terminal; and (c) said backend server providing a service to the mobile terminal according to content of said service providing request message.

2. The method of utilizing barcode images to communicate between a mobile terminal and a backend server according to claim 1, wherein, said method further comprises:

according to a preset coding rule, generating coding information corresponding to the service information and a barcode image corresponding to said coding information; and publishing said barcode image on at least one region contactable by users.

3. The method of utilizing barcode images to communicate between a mobile terminal and a backend server according to claim 1, wherein, said mobile terminal encrypts the content of said service providing request message, and then sends said service providing request message to said backend server; and said backend server decrypts the content of said service providing request message, and then provides a service to the said mobile terminal.

4. The method of utilizing barcode images to communicate between a mobile terminal and a backend server according to claim 1, wherein, said mobile terminal has a viewfinder screen, and when said camera focuses on said barcode image and the barcode image is shown on said viewfinder screen, said camera automatically takes a picture of said barcode image.

5. The method of utilizing barcode images to communicate between a mobile terminal and a backend server according to claim 1, wherein, said method further comprises according to the service information, preprocessing a service which is a provided service for said mobile terminal user using said mobile terminal.

6. The method of utilizing barcode images to communicate between a mobile terminal and a backend server according to claim 1, wherein, said information that uniquely identifies said mobile terminal includes at least one of a telephone number of the said mobile terminal, an IMEI number of said mobile terminal, a physical address of an interface of said mobile terminal and said username.

7. The method of utilizing barcode images to communicate between a mobile terminal and a backend server according to claim 1, wherein, said barcode image is one of a group consisting of a one-dimensional code, a two-dimensional code and a multi-dimensional code.

8. A method of utilizing barcode images to communicate between a mobile terminal and a backend server, the mobile terminal having a wireless connection with said backend server by using a wireless network, wherein, said method comprises:

a user of the said mobile terminal registering as a user of said backend server, and said backend server storing registration information of said user, said user having a unique username;

taking a picture of said barcode image using a camera disposed in said mobile terminal;

decoding the taken barcode image to obtain coding information using said mobile terminal;

parsing said coding information to determine, as a first determination, whether said barcode image is generated according to a preset coding rule, the preset coding rule specifying barcode information generated by or uniquely associated with the backend server with which the user of said mobile terminal has registered, wherein, only when according to the first determination it is determined that the barcode image is generated according to the preset coding rule, subsequent steps (a)-(c) are executed, and wherein when it is determined according to the first determination that the barcode image was not generated according to the preset coding rule, connecting the mobile terminal to a webpage corresponding to the coding information, and steps (a)-(c) are not executed;

(a) according to the coding information, extracting service information corresponding to said coding information using said mobile terminal;

(b) combining said coding information with coding information which is corresponding to user information using the mobile terminal, to generate another barcode image, and sending said another barcode image to said backend server, said user information at least including information that uniquely identifies the mobile terminal; and (c) decoding said another barcode image and providing in the backend server a service for said mobile terminal.

9. The method of utilizing barcode images to communicate between a mobile terminal and a backend server according to claim 8, wherein, said method further comprises:

according to a preset coding rule, generating coding information corresponding to the service information and a barcode image corresponding to the coding information; and publishing the barcode image on at least one region contactable by users.

10. The method of utilizing barcode images to communicate between a mobile terminal and a backend server according to claim 8, wherein, said mobile terminal has a viewfinder screen, and when said camera focuses on said barcode image and said barcode image is shown on said viewfinder screen, said camera automatically takes a picture of said barcode image.

11. The method of utilizing barcode images to communicate between a mobile terminal and a backend server according to claim 8, wherein, said method further comprises according to the service information, preprocessing a service which is provided for said mobile terminal user using said mobile terminal.

12. The method of utilizing barcode images to communicate between a mobile terminal and a backend server according to claim 8, wherein, said information that uniquely identifies said mobile terminal includes at least one of a telephone number of said mobile terminal, an IMEI number of said mobile terminal, a physical address of an interface of said mobile terminal and said username.

13. The method of utilizing barcode images to communicate between a mobile terminal and a backend server according to claim 8, wherein, said barcode image is one of a group consisting of a one-dimensional code, a two-dimensional code and a multi-dimensional code.

14. A method of utilizing barcode images to communicate between a mobile terminal and a service providing device, the mobile terminal having a connection with the service providing device through an interface of said mobile terminal, wherein, said method comprises:

taking a picture of a barcode image with a camera disposed in the mobile terminal, wherein the barcode image corresponds to coding information that corresponds, according to a preset coding rule to service information;

decoding the taken barcode image using the mobile terminal to obtain the coding information;

parsing said coding information to determine, as a first determination, whether said barcode image is generated according to a preset coding rule, the preset coding rule specifying barcode information generated by or uniquely associated with the backend server with which the user of said mobile terminal has registered, wherein, only when according to the first determination it is determined that said barcode image is generated according to the preset coding rule, subsequent steps (a)-(c) are executed, and wherein when it is determined according to the first determination that the barcode image is not generated according to the preset coding rule, connecting the mobile terminal to a webpage corresponding to said coding information, and steps (a)-(c) are not executed;

(a) according to the coding information, extracting, without accessing a network, service information corresponding to the coding information using said mobile terminal;

(b) sending a service providing request message to the service providing device using said mobile terminal; and (c) said service providing device providing a service for said mobile terminal according to content of said service providing request message.

15. The method of utilizing barcode images to communicate between a mobile terminal and a service providing device according to claim 14, wherein, the mobile terminal has a viewfinder screen, and when said camera focuses on said barcode image and said barcode image is shown on the viewfinder screen, said camera automatically takes a picture of said barcode image.

16. The method of utilizing barcode images to communicate between a mobile terminal and a service providing device according to claim 14, wherein, said interface is at least one of a USB interface, a memory card slot, a SIM card slot, an infrared interface and a bluetooth interface.

17. The method of utilizing barcode images to communicate between a mobile terminal and a service providing device according to claim 14, wherein, said barcode image is one of a group consisting of a one-dimensional code, a two-dimensional code and a multi-dimensional code.

18. A mobile terminal having a wireless connection with a backend server by using a wireless network, said mobile terminal comprising:

a camera, used for taking a picture of a barcode image;

a decoder configured to decode the taken barcode image to obtain coding information;

a coding information parsing unit configured to parse the coding information to determine, as a first determination, whether said barcode image is generated according to a preset coding rule, the preset coding rule specifying barcode information generated by or uniquely associated with the backend server with which the user of said mobile terminal has registered, and to extract, when the barcode image is generated according to the preset coding rule, corresponding service information according to said coding information;

a sending/receiving unit configured:

to send, only when according to the first determination it is determined that the barcode image is generated according to the preset code rule, registration information to said backend server and (a) to receive a registration success message from said backend server, and configured (b) to send a service providing request message to said backend server and (c) to receive a service from said backend server, and further configured;

to send, when it is determined according to the first determination that the barcode image is not generated according to the preset coding rule, a webpage request message to a network browser and to receive a webpage corresponding to said coding information from said network browser, and steps (a)-(c) are not executed;

an input unit configured to input information required by said backend server; and a display unit configured to display information required by said backend server.

19. The mobile terminal according to claim 18, further comprising:

a barcode image generating unit configured to combine said coding information with coding information corresponding to user information, to generate another barcode image, said user information at least including information that uniquely identifies said mobile terminal.

20. The mobile terminal according to claim 18, wherein, said mobile terminal comprises a viewfinder screen, and said camera is configured to take automatically, when said camera focuses on said barcode image and said barcode image is shown on the viewfinder screen, a picture of said barcode image.

21. The mobile terminal according to claim 20, further comprising an encrypting unit configured to encrypt content of said service providing request message.

22. The mobile terminal according to claim 18, further comprising a preprocessing unit configured to process a service provided for said mobile terminal user.

23. A mobile terminal having a connection with a service providing device through an interface of said mobile terminal, said mobile terminal comprising:

a camera, used for taking a picture of a barcode image;

a decoder, used for decoding the taken barcode image to obtain coding information;

a coding information parsing unit for parsing said coding information to determine, as a first determination, whether the barcode image is generated according to a preset coding rule, the preset coding rule specifying barcode information generated by or uniquely associated with the backend server with which the user of said mobile terminal has registered, and further for extracting, without accessing a network, only when, according to the first determination, the barcode image is generated according to the preset coding rule, corresponding service information according to the coding information;

a sending/receiving unit for (a) sending, only when, according to the first determination, said barcode image is generated according to the preset coding rule, a service providing request message to said service providing device, and (b) receiving a service from said service providing device; and the sending/receiving unit for sending, when it is determined according to the first determination that said barcode image is not generated according to the preset coding rule, a webpage request message to a network browser and receiving a webpage corresponding to the coding information from said network browser, and not executing steps (a)-(b);

an input unit, used for inputting information required by said backend server; and a display unit, used for displaying information required by said backend server.

24. The mobile terminal according to claim 23, wherein, said interface is at least one of a USB interface, a memory card slot, an SIM card slot, an infrared interface and a bluetooth interface.

25. The mobile terminal according to claim 23, wherein, said mobile terminal has a viewfinder screen, and when said camera focuses on said barcode image and said barcode image is shown on said viewfinder screen, said camera automatically takes a picture of said barcode image.

26. A system utilizing barcode images for implementing communication, the system comprising:

a mobile terminal and a backend server, said mobile terminal has a wireless connection with said backend server by using a wireless network, wherein said backend server includes:

a barcode image generating unit, used for generating coding information corresponding to service information and generating a barcode image corresponding to said coding information;

a first sending/receiving unit, used for receiving a service providing request message from said mobile terminal and providing a service for said mobile terminal, and further used for receiving registration information from said mobile terminal, and sending a registration success message to said mobile terminal; and a user registration unit, used for completing user registration, and storing user registration information to a database; and the mobile terminal includes:

a camera, used for taking a picture of said barcode image;

a decoder, used for decoding the taken barcode image to obtain coding information;

a coding information parsing unit, used for parsing the coding information to determine, as a first determination, whether the barcode image is generated according to a preset coding rule, the preset coding rule specifying barcode information generated by or uniquely associated with the backend server with which the user of said mobile terminal has registered, and for extracting, only when according to the first determination it is determined that the barcode image is generated according to the preset coding rule, corresponding service information according to the coding information;

a second sending/receiving unit, used for (a) sending registration information to said backend server and (b) receiving a registration success message from said backend server, only when it is determined according to the first determination that said barcode image is generated according to the preset coding rule, further used for (c) sending a service providing request message to said backend server and receiving a service from said backend server; and the second sending/receiving unit for sending, when it is determined according to the first determination that the barcode image is not generated according to the preset coding rule, a webpage request message to a network browser and receiving a webpage corresponding to said coding information from said network browser, and steps (a)-(c) are not executed;

an input unit, used for inputting information required by said backend server; and a display unit, used for displaying information required by said backend server.

27. The device utilizing barcode images for implementing communication according to claim 26, wherein, said backend server further comprises a database, used for storing the service information and the registration information.

28. The device utilizing barcode images for implementing communication according to claim 26, wherein, said mobile terminal further comprises:

an another barcode image generating unit used for combining said coding information with coding information corresponding to user information, to generate another barcode image, wherein said user information includes at least information that uniquely identifies said mobile terminal.

29. The device utilizing barcode images for implementing communication according to claim 28, wherein, said backend server further comprises another decoder, used for decoding said another barcode image to obtain corresponding coding information.

30. The device utilizing barcode images for implementing communication according to claim 26, wherein, said mobile terminal further comprises:

an encrypting unit, used for encrypting content of said service providing request message; and said backend server further comprises a decrypting unit, used for decrypting the content of said service providing request message.

31. The device utilizing barcode images for implementing communication according to claim 26, wherein, said mobile terminal further comprises a preprocessing unit, used for preprocessing a service which is provided for the mobile terminal user.

32. A mobile device utilizing barcode images for implementing communication between the device and a service providing device, said mobile device has a connection with the service providing device through an interface of said mobile device, wherein said service providing device comprises a first sending/receiving unit for receiving a service providing request message from said mobile device and providing a service for said mobile terminal, and the mobile device includes:

a camera, used for taking a picture of a barcode image;

a decoder, used for decoding the taken barcode image to obtain coding information;

a coding information parsing unit, used for parsing the coding information to determine, as a first determination, whether the barcode image is generated according to a preset coding rule, the preset coding rule specifying barcode information generated by or uniquely associated with the backend server with which the user of said mobile terminal has registered, and for extracting, without accessing a network, when the barcode image is generated according to the preset coding rule, corresponding service information according to the coding information;

a second sending/receiving unit, used for (a) sending, only when according to the first determination it is determined that the barcode image is generated according to the preset coding rule, a service providing request message to said service providing device and (b) receiving a service from said service providing device, and further for sending, when according to the first determination, it is determined that said barcode image is not generated according to the preset coding rule, a webpage request message to a network browser and receiving a webpage corresponding to said coding information from said network browser, and steps (a)-(b) are not executed;

an input unit, used for inputting information required by said backend server; and a display unit, used for displaying information required by said backend server.

33. The device utilizing barcode images for implementing communication according to claim 32, wherein, said interface is a USB interface, a memory card slot, an SIM card slot, an infrared interface or a bluetooth interface.

* * * * *